US012198531B2

(12) United States Patent
Werner

(10) Patent No.: US 12,198,531 B2
(45) Date of Patent: Jan. 14, 2025

(54) SMOKE DETECTOR SELF-TEST

(71) Applicant: Johnson Controls Tyco IP Holdings LLP, Milwaukee, WI (US)

(72) Inventor: Ross Werner, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 233 days.

(21) Appl. No.: 17/579,384

(22) Filed: Jan. 19, 2022

(65) Prior Publication Data

US 2023/0230468 A1 Jul. 20, 2023

(51) Int. Cl.
*G08B 29/14* (2006.01)
*G08B 17/107* (2006.01)
*G08B 17/113* (2006.01)

(52) U.S. Cl.
CPC ......... *G08B 29/145* (2013.01); *G08B 17/107* (2013.01); *G08B 17/113* (2013.01)

(58) Field of Classification Search
CPC ... G08B 29/145; G08B 17/107; G08B 17/113
See application file for complete search history.

(56) References Cited

U.S. PATENT DOCUMENTS 4,168,438 A * 9/1979 Morisue ............... G08B 17/113 340/630
4,596,465 A * 6/1986 Nagashima .......... G08B 17/113 340/630
4,728,801 A * 3/1988 O'Connor ............ G08B 29/043 340/630
5,138,302 A * 8/1992 Nagaoka .............. G08B 17/113 340/630
5,523,744 A * 6/1996 Wieser ................. G08B 29/145 340/630
5,594,410 A * 1/1997 Lucas .................... G08B 7/062 340/332
5,686,885 A * 11/1997 Bergman ............... G08B 25/10 340/506
5,686,896 A * 11/1997 Bergman ............. G08B 29/181 340/636.15
6,737,967 B2 * 5/2004 Farley .................. G08B 29/145 340/506

(Continued)

*Primary Examiner* — Curtis J King
(74) *Attorney, Agent, or Firm* — ArentFox Schiff LLP

(57) ABSTRACT

Example implementations include a smoke detector comprising a smoke chamber; an LED that generates light in the smoke chamber; a photodetector configured to detect whether a threshold amount of light is scattered by smoke particles in the smoke chamber; and one or more self-testing components configured to re-direct the light from the LED toward the photodetector for self-testing the LED and the photodetector. Some further implementations include one or more masking self-test components configured external to the smoke chamber to direct light from outside the smoke chamber into the smoke chamber and toward the photodetector for determining whether the smoke detector has been masked. Some further example implementations include a method comprising controlling one or more self-testing components of a smoke detector to re-direct at least a portion of light from an LED toward a photodetector; and determining whether the photodetector causes an alarm trigger in response to the controlling.

18 Claims, 12 Drawing Sheets

(56) References Cited

U.S. PATENT DOCUMENTS 6,788,197 B1 * 9/2004 Thuillard ............. G08B 17/107 340/630
7,242,292 B2 * 7/2007 Berezowski ............. G08B 1/08 340/331
7,365,648 B2 * 4/2008 Siber .................... G08B 17/113 340/693.11
7,978,087 B2 * 7/2011 Siber ...................... G08B 29/24 340/630
8,077,026 B2 * 12/2011 Jobe ..................... G08B 25/009 340/539.2
8,228,182 B2 * 7/2012 Orsini .................. G08B 29/126 250/206
8,816,867 B2 * 8/2014 Mammoto ........... G08B 29/183 340/630
9,076,313 B2 * 7/2015 Piccolo, III ............ G08B 29/00
11,410,534 B2 * 8/2022 Arellano Valderrama .................. G08B 25/04
11,790,765 B1 * 10/2023 Wolf .................... G08B 17/107 340/514
2003/0132849 A1 * 7/2003 Matsukuma ......... G08B 17/107 340/630
2003/0146833 A1 * 8/2003 Johnston .............. G08B 25/012 340/521
2003/0210138 A1 * 11/2003 Farley .................. G08B 29/145 340/514
2004/0119585 A1 * 6/2004 Farley .................. G08B 29/145 340/514
2004/0135695 A1 * 7/2004 Barton ................. G08B 25/002 340/628
2004/0217857 A1 * 11/2004 Lennartz .............. G08B 29/145 340/506
2004/0246137 A1 * 12/2004 Bobenhausen ...... G08B 29/043 340/606
2005/0057353 A1 * 3/2005 Barrieau .................. G08B 7/06 340/506
2005/0128079 A1 * 6/2005 Berezowski ............. G08B 1/08 340/539.22
2005/0128097 A1 * 6/2005 Piccolo, III ............ G08B 25/04 340/331
2005/0280527 A1 * 12/2005 Farley .................. G08B 29/145 340/514
2006/0202847 A1 * 9/2006 Oppelt ................. G08B 17/107 340/630
2007/0165523 A1 * 7/2007 Berezowski ............. G08B 1/08 370/400
2007/0194907 A1 * 8/2007 Tawil ...................... G08B 29/14 340/514
2008/0084291 A1 * 4/2008 Campion ............. G08B 29/145 340/514
2008/0219458 A1 * 9/2008 Brooks .................... H03G 3/32 381/57
2008/0246623 A1 * 10/2008 Nagashima ............ G01N 21/53 340/630
2009/0128821 A1 * 5/2009 Sugimoto .............. G01N 21/53 356/438
2009/0212959 A1 * 8/2009 Suber, III ............... G08B 25/08 340/603
2009/0243843 A1 * 10/2009 Clow ................... G08B 29/046 340/540
2010/0315224 A1 * 12/2010 Orsini .................. G08B 29/126 340/506
2013/0008787 A1 * 1/2013 Mammoto ............. G08B 17/00 204/415
2013/0119281 A1 * 5/2013 Lang .................... G08B 29/183 250/564
2013/0192341 A1 * 8/2013 Ajay ....................... B03C 3/366 96/60
2013/0239659 A1 * 9/2013 Brighenti ........... G01N 21/4738 73/28.01
2013/0334417 A1 * 12/2013 Lewiner ............ G01N 33/0009 250/338.5
2014/0266675 A1 * 9/2014 Piccolo, III .......... G08B 29/126 340/514
2014/0266677 A1 * 9/2014 Piccolo, III ............ G08B 29/00 340/514
2014/0375449 A1 * 12/2014 Piccolo, III .......... G08B 29/126 340/506
2015/0077737 A1 * 3/2015 Belinsky ............ G01N 15/0211 250/208.2
2015/0302727 A1 * 10/2015 Piccolo, III .......... G08B 17/107 340/514
2015/0302728 A1 * 10/2015 Gettings .............. G08B 19/005 340/506
2015/0310732 A1 * 10/2015 Piccolo, III .......... G08B 29/145 340/515
2015/0379846 A1 * 12/2015 Bressanutti .......... G08B 17/113 340/630
2016/0180700 A1 * 6/2016 Butalla, III .......... G08B 29/126 340/514
2016/0328936 A1 * 11/2016 Fischer .................. G01N 21/53
2017/0142854 A1 * 5/2017 Varieur ................... E05C 3/042
2017/0162019 A1 * 6/2017 Cruse ..................... G02B 5/003
2017/0169682 A1 * 6/2017 Bressanutti .......... G08B 17/107
2017/0193811 A1 * 7/2017 Stowell ................ G08B 29/145
2017/0213434 A1 * 7/2017 Bressanutti .......... G08B 17/113
2017/0278381 A1 * 9/2017 Nalukurthy .......... G08B 29/185
2017/0287318 A1 * 10/2017 Moffa .................. G08B 29/043
2018/0012482 A1 * 1/2018 Brown ................... G05B 15/02
2018/0293878 A1 * 10/2018 Penney ............... B05B 17/0646
2018/0312255 A1 * 11/2018 Illuminati ............ G08B 29/145
2019/0080579 A1 * 3/2019 Penney ................ G08B 17/113
2019/0213865 A1 * 7/2019 S.R ........................ G08B 25/10
2019/0251816 A1 * 8/2019 Fang .................... G08B 17/107
2019/0291866 A1 * 9/2019 Jegodtka ............... B64C 39/024
2019/0378402 A1 * 12/2019 Bouchard ............ G08B 17/107
2020/0035088 A1 * 1/2020 Penney ................ G08B 29/145
2020/0250951 A1 * 8/2020 Chiang ................ G08B 17/117
2020/0394900 A1 * 12/2020 Lontka ...................... G06T 7/90
2021/0003310 A1 * 1/2021 Shnaiderman ........... F24F 11/30
2021/0228927 A1 * 7/2021 Hofmann ............... A62C 37/36
2021/0255101 A1 * 8/2021 Shimadzu ............ G08B 17/113
2021/0350692 A1 * 11/2021 Nalukurthy ........... G06F 16/248
2021/0350693 A1 * 11/2021 Nalukurthy ............ G08B 17/00
2022/0058929 A1 * 2/2022 Dearden .............. G08B 29/145
2022/0058939 A1 * 2/2022 Penney ................ G08B 17/113
2022/0099572 A1 * 3/2022 Yu ........................ G08B 29/185
2022/0101701 A1 * 3/2022 Date ........................ G08B 3/10
2022/0241634 A1 * 8/2022 Krutskevych .......... A62C 35/68
2022/0383721 A1 * 12/2022 Fischer ................ G08B 29/145
2022/0392447 A1 * 12/2022 Goriparti ................ G10L 15/22
2023/0206742 A1 * 6/2023 Yang .................... G01N 21/534 340/630

* cited by examiner

SMOKE DETECTOR SELF-TEST

BACKGROUND

The present disclosure relates generally to fire detection systems and methods, and more particularly, to smoke detectors.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a smoke detector comprising a smoke chamber; a light emitting diode (LED) configured to generate light that is directed into the smoke chamber; a photodetector configured to detect whether at least a threshold amount of the light is scattered by smoke particles when smoke is present in the smoke chamber; and one or more self-testing components configured to re-direct at least a portion of the light from the LED toward the photodetector for self-testing the LED and the photodetector.

Another example implementation includes a smoke detector comprising a smoke chamber; a light emitting diode (LED) configured to generate light that is directed into the smoke chamber; a photodetector configured to detect whether at least a threshold amount of the light is scattered by smoke particles when smoke is present in the smoke chamber; and one or more self-testing components configured to re-direct at least a portion of the light from the LED toward the photodetector for self-testing the LED and the photodetector.

A further example implementation includes a method comprising controlling one or more one or more self-testing components of a smoke detector to re-direct at least a portion of light from a light emitting diode (LED) toward a photodetector, wherein the LED is configured to generate the light that is directed into a smoke chamber of the smoke detector, wherein the photodetector is configured to detect whether at least a threshold amount of the light is scattered by smoke particles when smoke is present in the smoke chamber; and determining whether the photodetector causes an alarm trigger in response to the controlling.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Some present aspects implement self-test functionality in a smoke detector, where the self-test functionality validates at least a portion of an optical path that is used to detect the presence of smoke in a smoke chamber of the smoke detector. Some alternative or additional aspects implement further self-test functionality for detecting a masking of the smoke detector (which may be due to dust, bugs, malicious attempts to disable the smoke detector, etc.), where the self-test functionality validates an optical path from outside the smoke chamber into the smoke chamber.

Turning now to the figures, example aspects are depicted with reference to one or more components described herein, where components in dashed lines may be optional.

Figure 1:
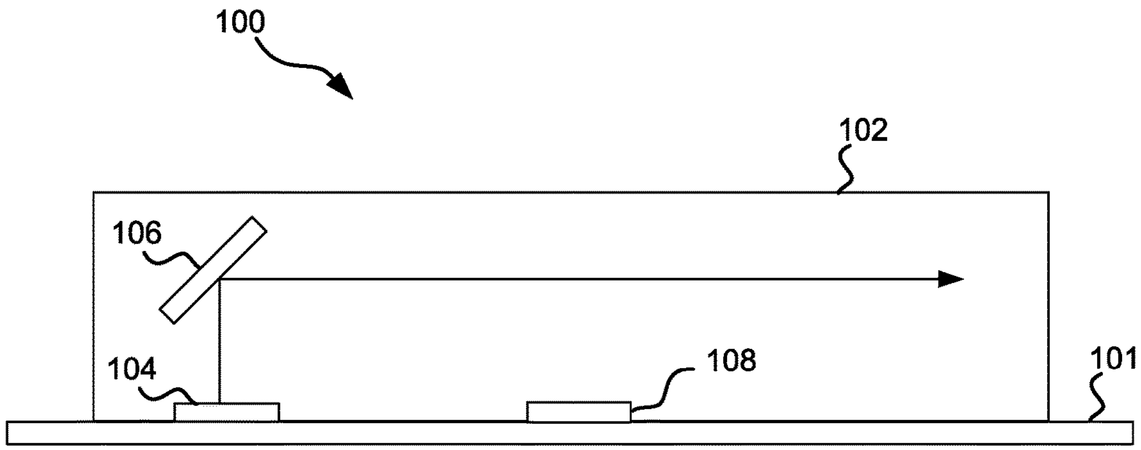
FIG. 1 is a side, cross-sectional view of an example smoke detector according to some aspects.

Referring to FIG. 1, one non-limiting example aspect of a smoke detector 100 includes a smoke chamber 102 assembled on a printed circuit board (PCB) substrate 101. Within the smoke chamber 102, a light emitting diode (LED) 104 (or other light source) and a photodetector 108 are surface-mounted on the PCB substrate 101 such that the LED 104 is operable to generate light into the smoke chamber 102 and the photodetector 108 is operable to detect light received from within the smoke chamber 102. A mirror 106 is configured within the smoke chamber 102, such as but not limited to being supported by a component or structure that holds the mirror 106 at a desired position and orientation within the smoke chamber 102. The position and orientation of the mirror 106 are configured such that the mirror 106 reflects the light generated by the LED 104 and the reflected light passes substantially in parallel to the surface of the photodetector 108. Accordingly, in absence of any smoke in the smoke chamber 102, the light reflected from the LED 104 by the mirror 106 does not strike the photodetector 108 and is therefore not detectable by the photodetector 108. The use of the mirror 106 in these aspects allows for both the LED 104 and the photodetector 108 to be surface-mounted on the PCB substrate 101, thus reducing PCB assembly costs.

Figure 2:
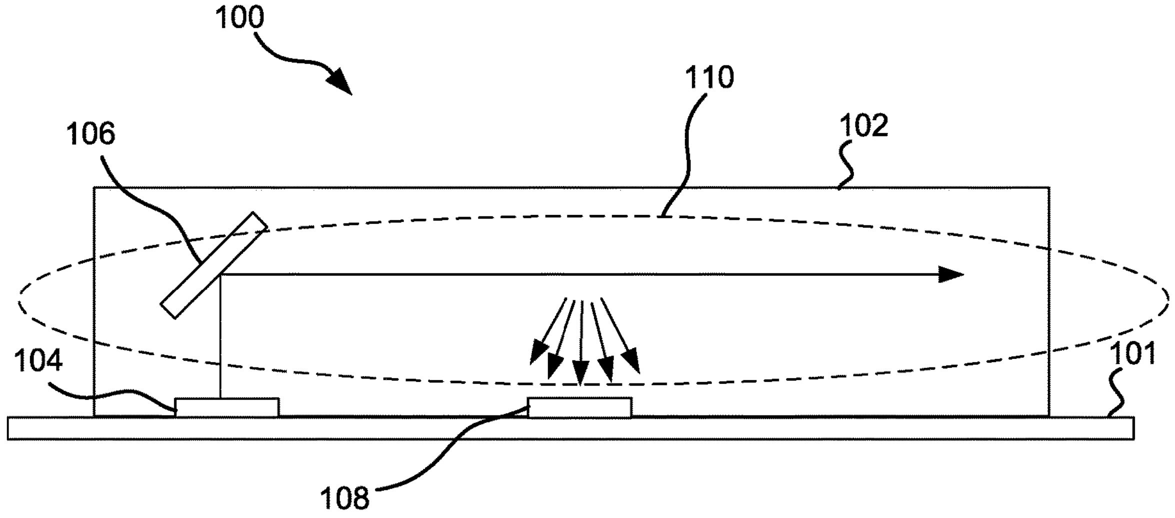
FIG. 2 is a side, cross-sectional view of the example smoke detector of FIG. 1 when smoke enters a smoke chamber of the smoke detector, according to some aspects.

Referring to FIG. 2, when smoke 110 enters the smoke chamber 102 of the smoke detector 100, the light reflected from the LED 104 by the mirror 106 is scattered by smoke particles in the smoke 110, and at least a portion of the scattered light strikes the photodetector 108 and therefore may be detectable by the photodetector 108. A smoke alarm is triggered when there is sufficient scattered light striking the photodetector 108 and detected by the photodetector 108, which may happen when sufficient smoke enters the smoke chamber 102.

Some self-test processes for smoke detectors require a person to temporarily introduce smoke into the environment around the smoke detector and/or into the smoke chamber to ensure that the smoke detector triggers an alarm. This is typically done with artificial smoke output by an aerosol can. However, these self-test processes are cumbersome and time consuming, in particular, in large installations with many smoke detectors.

Some self-test systems configure a small amount of paraffin or other suitable substance within the smoke detector such that the paraffin may be heated with an electrical element to generate smoke in order to test the smoke detector. However, the evaporated paraffin may also contaminate the smoke detector. Further, heating the paraffin requires a significant amount of power for the heating element, which is undesirable, in particular, for battery-powered residential smoke detectors which may be required to have a sealed 10-year-life battery.

In contrast, some present aspects provide one or more self-testing components that re-direct the light from the LED 104 such that the re-directed light strikes the photodetector 108. Accordingly, these aspects provide a low-cost and/or low-power self-test mechanism for testing the LED 104 and the photodetector 108. Some alternative or additional aspects provide a further self-test mechanism that directs light from a light source outside the smoke chamber 102 such that the light strikes the photodetector 108. Accordingly, these alternative or additional aspects may test whether the screens around, and/or pathways into, the smoke chamber 102 are blocked with dust, insects, etc., and/or whether the smoke detector 100 has been tampered with. The efficient, low-cost, and low-power self-test mechanisms according to the present aspects may be incorporated into any type of smoke detector, and may be especially beneficial for use with a battery-powered and/or a residential smoke detector, such as a smoke detector with a sealed 10-year-life battery.

Figure 3:
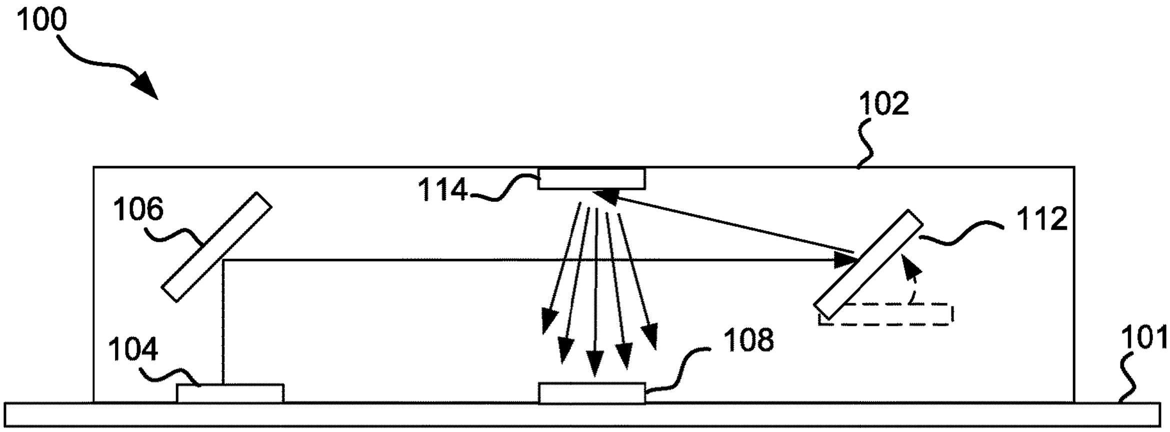
FIG. 3 is a side, cross-sectional view of an example smoke detector that includes self-test functionality for self-testing a light emitting diode (LED) and a photodetector of the smoke detector, according to some aspects.

Referring to FIG. 3, in one non-limiting aspect, for example, a controllable mirror 112 may be configured within the smoke chamber 102 and may have a position/orientation that is controllable (e.g., using a micro-electro-mechanical systems (MEMS) device) between a normal state and a self-test state. In the normal state, the controllable mirror 112 lays substantially in parallel to the direction of the light reflected from the LED 104 by the mirror 106, and the controllable mirror 112 is positioned such that the light passes over the controllable mirror 112 and does not strike the controllable mirror 112. However, in the self-test state, the controllable mirror 112 is positioned in the path of the light reflected from the LED 104 by the mirror 106, and the controllable mirror 112 is configured in an orientation to reflect the received light toward a light scattering surface 114 configured at the top of the smoke chamber 102 and facing the photodetector 108. The light scattering surface

114 has diffuse reflection properties and is configured to scatter the light in multiple angles such that at least a portion of the scattered light strikes the photodetector 108. Accordingly, in the self-test state, the light from the LED 104 is reflected by the mirror 106 toward the controllable mirror 112, then reflected by the controllable mirror 112 toward the light scattering surface 114, then scattered by the light scattering surface 114 to be detectable by the photodetector 108.

In some non-limiting aspects, the light scattering surface 114 may be covered with a paint having the necessary properties to scatter incident light in multiple directions to be easily visible. In some other non-limiting aspects, the light scattering surface 114 may include an injection-molded plastic surface that is textured to achieve the desired scattering. It should be understood, however, that any type of surface with sufficient light scattering properties may be used.

In some aspects, since the amount of light reflected by smoke particles in the smoke chamber 102 is a fraction of the light emitted from the LED 104, the properties of the light scattering surface 114 may be tuned depending on how much light is to be deflected in different angles, so as to more closely simulate the presence of smoke. For example, the angle of deflection caused by the light scattering surface 114 may be tuned to simulate a particular amount of smoke, e.g., a small amount of smoke, a threshold trigger level of smoke, heavy smoke, etc. For example, the deflection properties of the light scattering surface 114 may be tuned so that the photodetector 108 causes an alarm trigger as if a threshold amount of smoke has entered the smoke chamber 102, and if the alarm is not triggered, the self-test has failed, indicating that, for example, the detector is dirty or the light source is wearing out, etc. Alternatively, or additionally, the light scattering surface 114 may have different areas with different light scattering properties, and the controllable mirror 112 may be controlled to reflect light onto a particular area to test the response of the smoke detector 100 to different simulated levels of smoke in the smoke chamber 102.

Alternatively, or additionally, since the amount of light reflected by smoke particles in the smoke chamber 102 is a fraction of the light emitted from the LED 104, the drive current to the LED 104 during self-testing may be controlled (e.g., low intensity, medium intensity, high intensity) to simulate the different amounts of light scattered by various levels of smoke in the smoke chamber 102.

Figure 4:
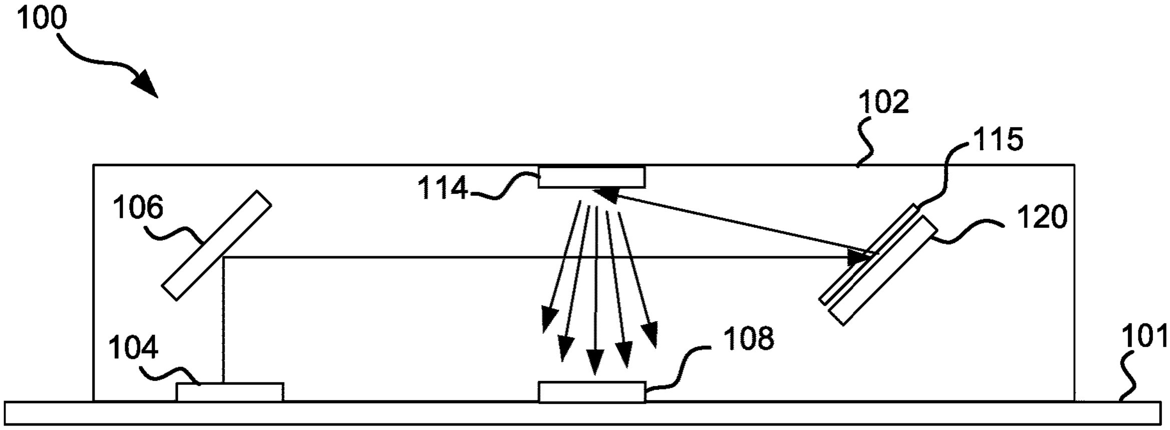
FIG. 4 is a side, cross-sectional view of an example smoke detector that includes self-test functionality for self-testing an LED and a photodetector of the smoke detector, according to some aspects.

Referring to FIG. 4, in an alternative or additional non-limiting aspect, for example, a self-test mirror 120 is fixedly configured within the smoke chamber 102 and is covered by a shutter 115 that is controllable between a closed state (for normal operation of the smoke detector 100) and an open state (for self-testing the smoke detector 100). The self-test mirror 120 is fixedly positioned in the path of the light reflected from the LED 104 by the mirror 106, and the self-test mirror 120 is fixedly configured in an orientation to reflect any received light toward the light scattering surface 114. When the shutter 115 is closed, no light reaches the self-test mirror 120. However, when the shutter 115 is opened, the light from the LED 104 is reflected by the mirror 106 toward the self-test mirror 120, then reflected by the self-test mirror 120 toward the light scattering surface 114, then scattered by the light scattering surface 114 to be detectable by the photodetector 108. In some cases, the shutter 115 may be used with a controllable mirror 112 (FIG. 3) to ensure that no light is accidentally reflected off of the controllable mirror 112 and onto the photodetector 108.

Alternatively, instead of or in addition to controlling the reflectivity of the self-test mirror 120 by a shutter, the reflectivity of the light scattering surface 114 may be controlled by a shutter, which may be placed adjacent to the surface of the self-test mirror 120 and/or the light scattering surface, and/or anywhere in the path between the light source (e.g., the LED 104) and the self-test mirror 120 and the light scattering surface 114.

Figure 5:
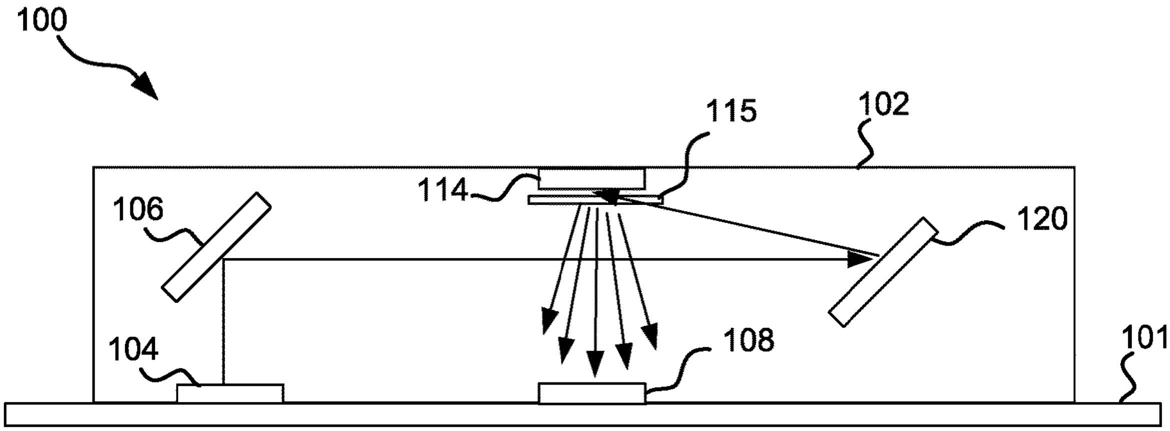
FIG. 5 is a side, cross-sectional view of an example smoke detector that includes self-test functionality for self-testing an LED and a photodetector of the smoke detector, according to some aspects.

For example, referring to FIG. 5, in another non-limiting aspect, the light scattering surface 114 may be covered by the shutter 115 that is controllable between a closed state (for normal operation of the smoke detector 100) and an open state (for self-testing the smoke detector 100). When the shutter 115 is closed, no light reaches the light scattering surface 114. However, when the shutter 115 is opened, the light from the LED 104 is reflected by the mirror 106 toward the self-test mirror 120, then reflected by the self-test mirror 120 toward the light scattering surface 114, then scattered by the light scattering surface 114 to be detectable by the photodetector 108.

Figure 6:
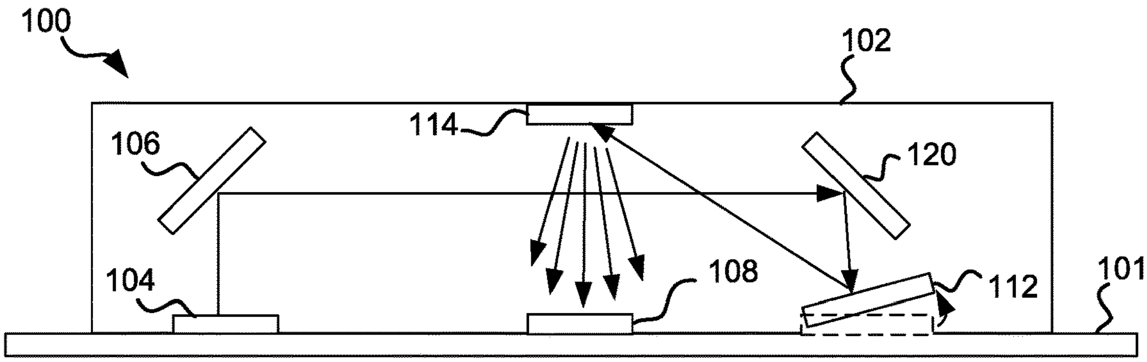
FIG. 6 is a side, cross-sectional view of an example smoke detector that includes self-test functionality for self-testing an LED and a photodetector of the smoke detector, according to some aspects.

Referring to FIG. 6, in another alternative or additional non-limiting example aspect, the self-test mirror 120 is fixedly configured in an orientation to reflect the received light toward the controllable mirror 112 that is surface-mounted on the PCB substrate 101 below the self-test mirror 120. For example, this configuration may be useful in some cases where it is easier and/or more cost effective to mount the controllable mirror 112 on the PCB substrate 101 and the fixed mirrors 106, 120 on a component or structure associated with the smoke chamber 102. The controllable mirror 112 is controllable (e.g., using a MEMS device) between a normal state and a self-test state. In the normal state, the controllable mirror 112 lays substantially flat on the PCB substrate 101 and reflects the received light back toward the self-test mirror 120. However, in the self-test state, the controllable mirror 112 is movable to an orientation to reflect the received light toward the light scattering surface 114, which scatters the light such that at least a portion of the scattered light strikes the photodetector 108. Accordingly, in the self-test state, the light from the LED 104 is reflected by the mirror 106 toward the self-test mirror 120, then reflected by the self-test mirror 120 toward the controllable mirror 112, then reflected by the controllable mirror 112 toward the light scattering surface 114, then scattered by the light scattering surface 114 to be detectable by the photodetector 108.

Figure 7:
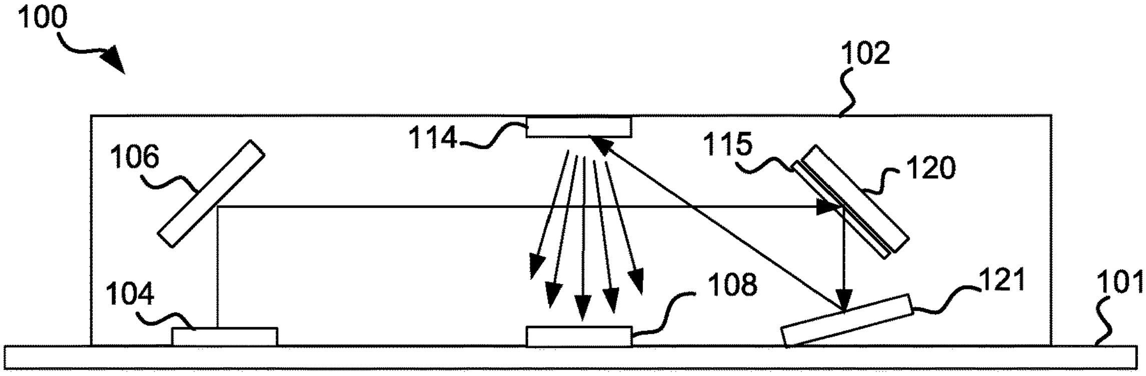
FIG. 7 is a side, cross-sectional view of an example smoke detector that includes self-test functionality for self-testing an LED and a photodetector of the smoke detector, according to some aspects.

Referring to FIG. 7, in yet another alternative or additional aspect, the self-test mirror 120 is fixedly configured in an orientation to reflect any received light toward a surface-mount mirror 121 that is fixedly surface-mounted on the PCB substrate 101 and spaced apart from the self-test mirror 120. The self-test mirror 120 is covered by the shutter 115 that is controllable between a closed state (for normal operation of the smoke detector 100) and an open state (for self-testing the smoke detector 100). When the shutter 115 is closed, no light reaches the self-test mirror 120. However, when the shutter 115 is opened, the light from the LED 104 is reflected by the mirror 106 toward the self-test mirror 120, then reflected by the self-test mirror 120 toward the surface-mount mirror 121, then reflected by the surface-mount mirror 121 toward the light scattering surface 114, then scattered by the light scattering surface 114 to be detectable by the photodetector 108.

Alternatively, instead of or in addition to controlling the reflectivity of the self-test mirror 120 by a shutter, the reflectivity of the surface-mount mirror 121 and/or the light scattering surface 114 may be controlled by a shutter, as described above and below.

Figure 8:
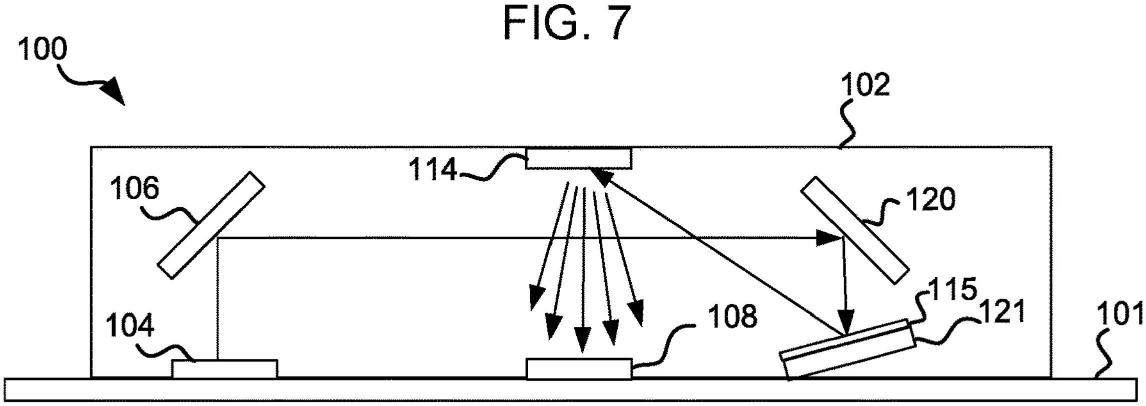
FIG. 8 is a side, cross-sectional view of an example smoke detector that includes self-test functionality for self-testing an LED and a photodetector of the smoke detector, according to some aspects.

For example, referring to FIG. 8, in a further alternative aspect, the surface-mount mirror 121 is covered by the shutter 115 that is controllable between a closed state (for normal operation of the smoke detector 100) and an open state (for self-testing the smoke detector 100). When the shutter 115 is closed, no light reaches the surface-mount mirror 121. However, when the shutter 115 is opened, the light from the LED 104 is reflected by the mirror 106 toward the self-test mirror 120, then reflected by the self-test mirror 120 toward the surface-mount mirror 121, then reflected by the surface-mount mirror 121 toward the light scattering surface 114, then scattered by the light scattering surface 114 to be detectable by the photodetector 108. In some cases, the shutter 115 may be used with a controllable mirror 112 (FIG. 6) to ensure that no light is accidentally reflected off of the controllable mirror 112 and onto the photodetector 108.

Figure 9:
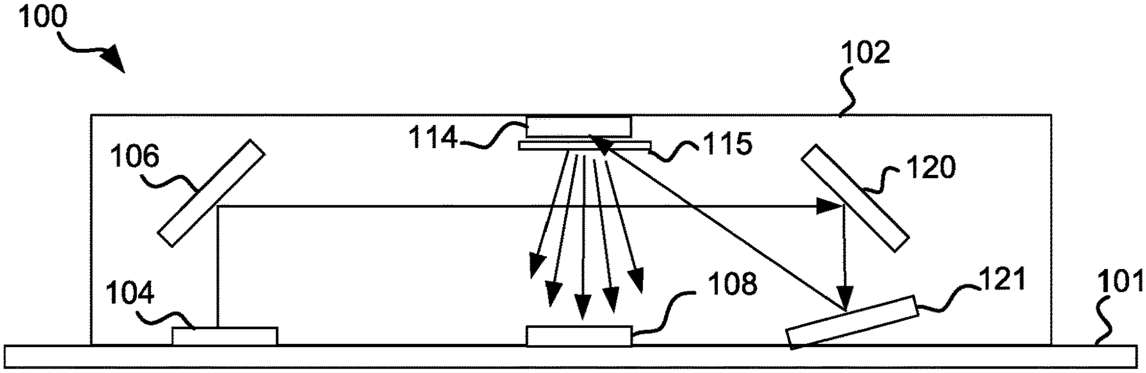
FIG. 9 is a side, cross-sectional view of an example smoke detector that includes self-test functionality for self-testing an LED and a photodetector of the smoke detector, according to some aspects.

In another example additional and/or alternative aspect, referring to FIG. 9, the light scattering surface 114 may be covered by the shutter 115 that is controllable between a closed state (for normal operation of the smoke detector 100) and an open state (for self-testing the smoke detector 100). When the shutter 115 is closed, no light reaches the light scattering surface 114. However, when the shutter 115 is opened, the light from the LED 104 is reflected by the mirror 106 toward the self-test mirror 120, then reflected by the self-test mirror 120 toward the surface-mount mirror 121, then reflected by the surface-mount mirror 121 toward the light scattering surface 114, then scattered by the light scattering surface 114 to be detectable by the photodetector 108.

In some further alternative aspects, the smoke detector 100 may not include the light scattering surface 114, or the smoke detector 100 may not include the controllable mirror 112 and the light scattering surface 114 may be controllable.

Figure 10:
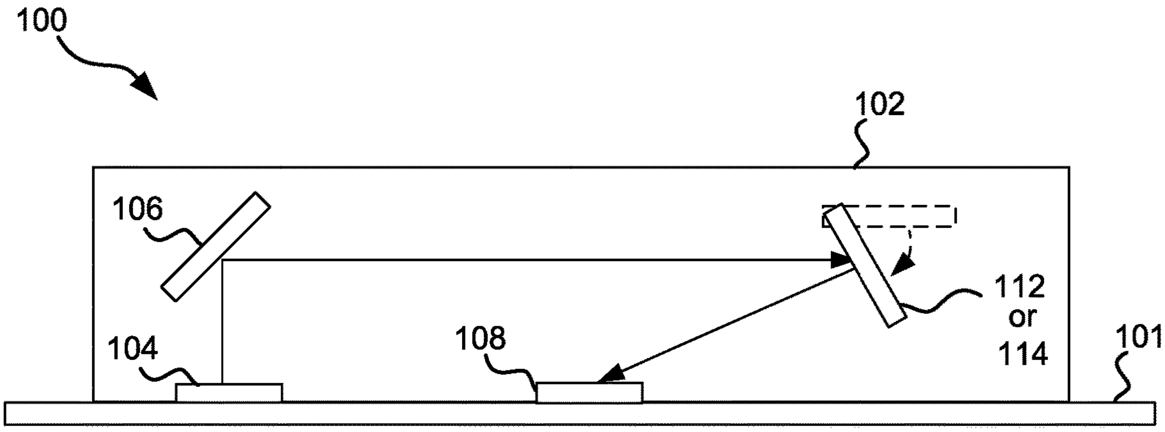
FIG. 10 is a side, cross-sectional view of an example smoke detector that includes self-test functionality for self-testing an LED and a photodetector of the smoke detector, according to some aspects.

For example, in one non-limiting example alternative or additional aspect, referring to FIG. 10, the controllable mirror 112 is controllable (e.g., using a MEMS device) between a normal state and a self-test state. In the normal state, the controllable mirror 112 lays substantially in parallel to the direction of the light reflected from the LED 104 by the mirror 106 and is positioned such that the light passes over the controllable mirror 112 and does not strike the controllable mirror 112. However, in the self-test state, the controllable mirror 112 is positioned in the path of the light reflected from the LED 104 by the mirror 106, and the controllable mirror 112 is configured in an orientation to reflect the received light toward the photodetector 108. Accordingly, in the self-test state, the light from the LED 104 is reflected by the mirror 106 toward the controllable mirror 112, then reflected by the controllable mirror 112 toward the photodetector 108 to be detectable by the photodetector 108. Alternatively, in this configuration, the light scattering surface 114 may be controllable and may replace the controllable mirror 112 such that the light from the LED 104 is reflected by the mirror 106 toward the controllable light scattering surface 114, then scattered by the controllable light scattering surface 114 toward the photodetector 108 to be detectable by the photodetector 108.

Figure 11:
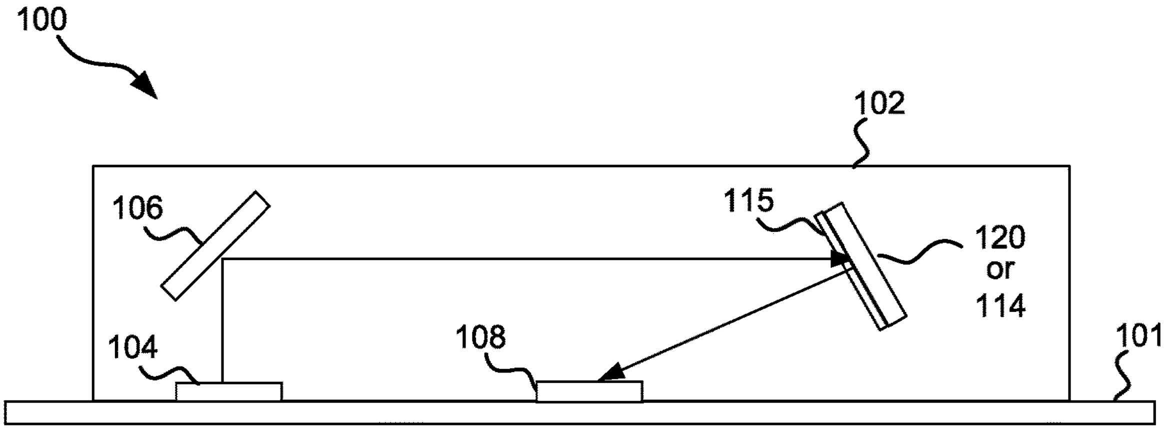
FIG. 11 is a side, cross-sectional view of an example smoke detector that includes self-test functionality for self-testing an LED and a photodetector of the smoke detector, according to some aspects.

In another non-limiting alternative or additional aspect, for example, referring to FIG. 11, the self-test mirror 120 is fixedly configured in an orientation to reflect any received light toward the photodetector 108. The self-test mirror 120 is covered by the shutter 115 that is controllable between a closed state (for normal operation of the smoke detector 100) and an open state (for self-testing the smoke detector 100). When the shutter 115 is closed, no light reaches the self-test mirror 120. However, when the shutter 115 is opened, the light from the LED 104 is reflected by the mirror 106 toward the self-test mirror 120, then reflected by the self-test mirror 120 toward the photodetector 108. Alternatively, in this configuration, the light scattering surface 114 may replace the self-test mirror 120.

In some other alternative and/or additional aspects, the smoke detector 100 may not include any additional components for self-testing, and instead the mirror 106 and/or the light scattering surface 114 may be controllable to reflect the received light directly toward the photodetector 108 for self-testing the smoke detector 100.

Figure 12:
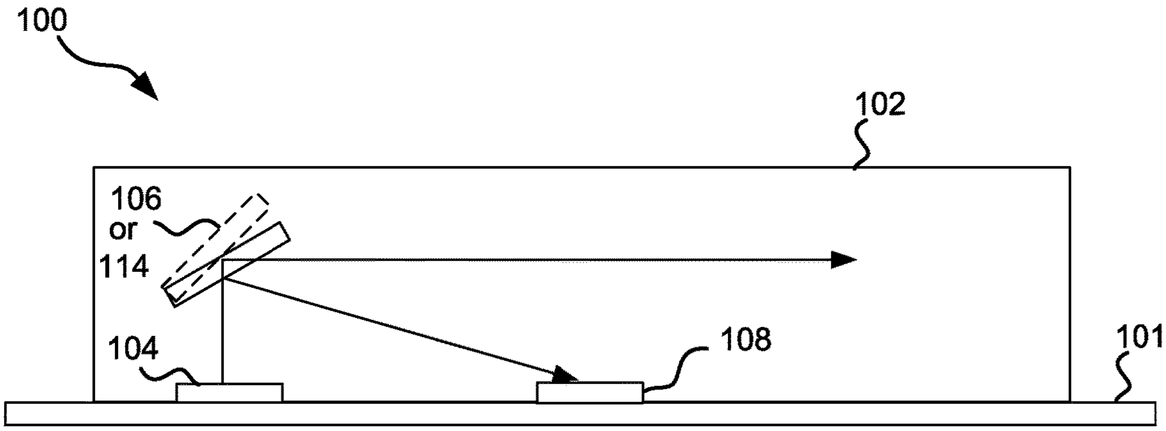
FIG. 12 is a side, cross-sectional view of an example smoke detector that includes self-test functionality for self-testing an LED and a photodetector of the smoke detector, according to some aspects.

For example, referring to FIG. 12, the mirror 106 may be controllable (e.g., using a MEMS device) between a normal state and a self-test state. In the normal state, the mirror 106 reflects light from the LED 104 in a direction that is substantially in parallel to the surface of the photodetector 108. However, in the self-test state, the mirror 106 is configured in an orientation to reflect the received light directly toward the photodetector 108. Alternatively, in this configuration, the light scattering surface 114 may replace the mirror 106 and may be controllable to scatter the received light directly toward the photodetector 108 or to avoid scattering the received light toward the photodetector 108.

In some alternative and/or additional non-limiting aspects, a self-test light source may be configured in the smoke chamber 102 to light the photodetector 108 for testing the photodetector 108. In these aspects, the LED 104 may be separately tested, for example, by measuring the current running through the LED 104 and comparing the measured current to a threshold current to determine whether the LED 104 is operating properly.

Some alternative and/or additional aspects implement one or more masking self-test components that validate an optical path from outside the smoke chamber 102 into the smoke chamber 102 in order to detect whether the smoke detector 100 has been masked (e.g., due to dust, bugs, malicious attempts to disable the smoke detector, etc.). Detection of masking is desirable because such masking, e.g., blocking of the flow of smoke into the smoke chamber 102, may render the smoke detector 100 ineffective in detecting smoke.

Figure 13:
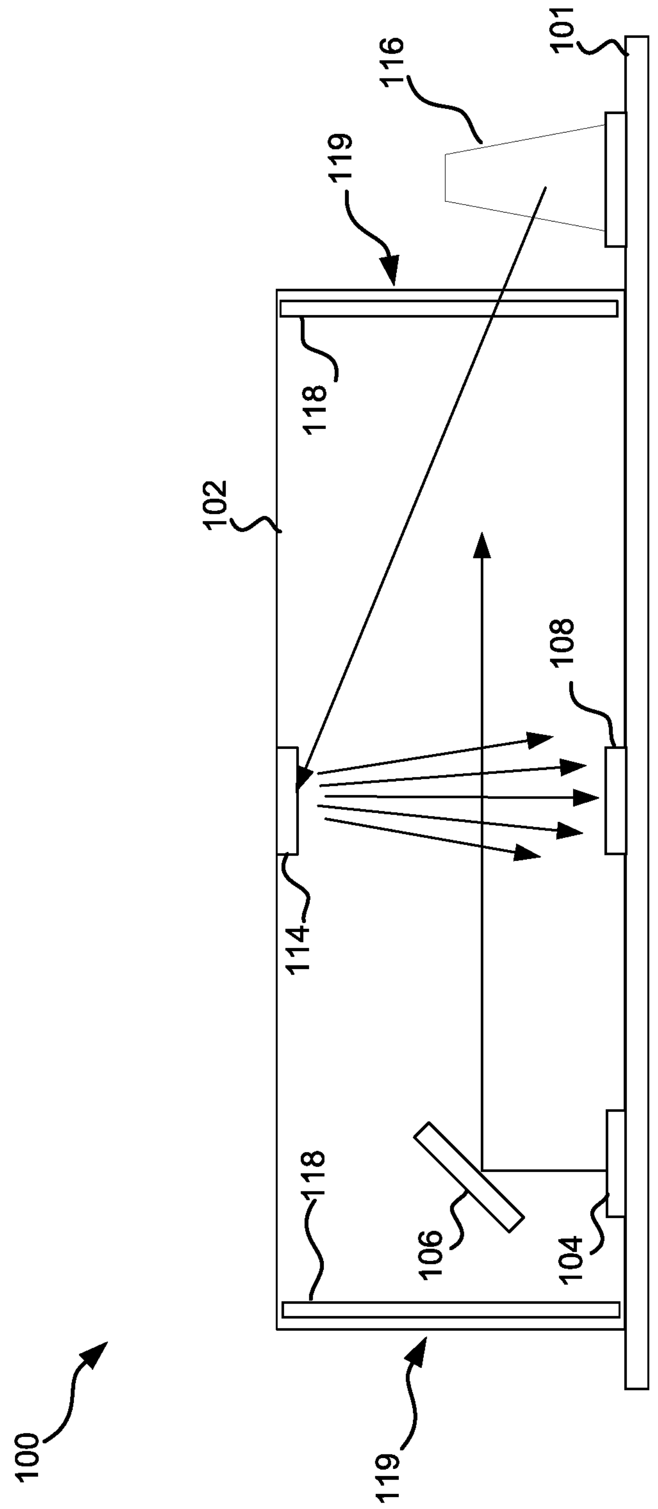
FIG. 13 is a side, cross-sectional view of an example smoke detector that includes self-test functionality for detecting a masking of the smoke detector, according to some aspects.

Referring to FIG. 13, for example, in one non-limiting aspect, one or more external LEDs 116 may be configured external to the smoke chamber 102 on the PCB substrate 101. The one or more external LEDs 116 are configured to emit light toward one or more screens 118 covering and protecting, or in some cases forming, one or more smoke inlets 119 of the smoke chamber 102. The one or more screens 118 may include a mesh-like structure or any structure having openings that allow smoke to enter the smoke chamber 102 through the smoke inlets 119 so that the presence of smoke is detectable by the smoke detector 100. In some cases, the one or more screens 118 are configured to prevent insects and/or environmental contaminants larger than smoke particles from entering the smoke chamber 102.

The one or more external LEDs 116 are positioned such that, in absence of any masking of the smoke detector 100, at least a portion of the light from the external LEDs 116 passes through the screens 118 and strikes the light scattering surface 114 configured at the top of the smoke chamber 102 and facing the photodetector 108. The light scattering surface 114 then scatters the light such that at least a portion of the scattered light strikes the photodetector 108, thus indicating that no masking has occurred. However, when the smoke detector 100 is masked (e.g., when the smoke detector 100 is covered/painted on, the environment is dusty, spider webs are present within the smoke chamber 102 and/or on the screens 118, etc.), the masking blocks the light from the one or more external LEDs 116, and the light from the one or more external LEDs 116 does not reach the light scattering surface 114.

In some non-limiting aspects, multiple external LEDs 116 may be configured around the perimeter of the smoke chamber 102 to self-test the smoke detector 100 from multiple angles.

In some non-limiting aspects, the one or more external LEDs 116 may be made with an injection-molded plastic light pipe or prism. In some non-limiting aspects, the external LEDs 116 may be surface-mounted on the PCB substrate 101.

Figure 14:
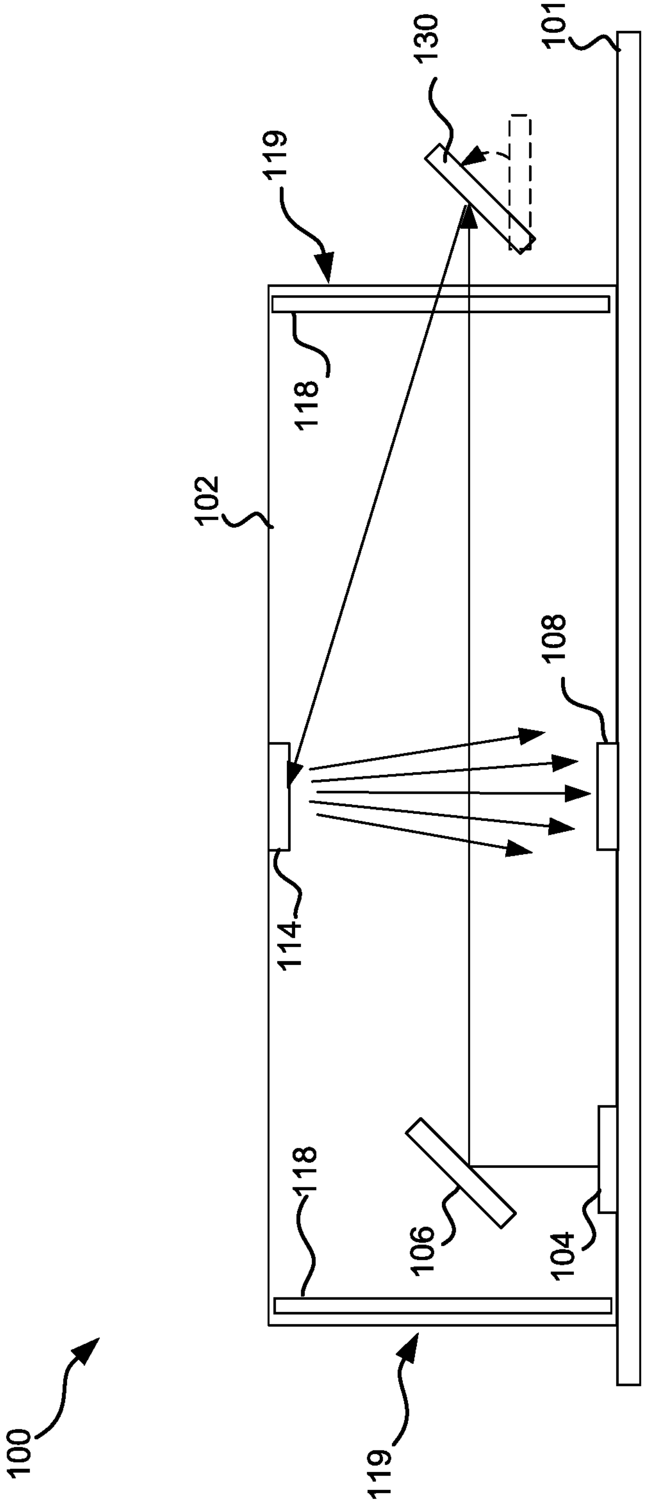
FIG. 14 is a side, cross-sectional view of an example smoke detector that includes self-test functionality for detecting a masking of the smoke detector, according to some aspects.

Referring to FIG. 14, in another additional or alternative non-limiting example aspect, an external controllable mirror 130 may be configured external to the smoke chamber 102 and may be controllable (e.g., using a MEMS device) between a normal state and a masking self-test state. In the normal state, the external controllable mirror 130 lays substantially in parallel to the direction of the light reflected from the LED 104 by the mirror 106, and the external controllable mirror 130 is positioned such that, in absence of any masking of the smoke detector 100, the light passes through the screens 118 and over the controllable mirror 112 but does not strike the controllable mirror 112. However, in the masking self-test state, the external controllable mirror 130 is positioned in the path of the light reflected from the LED 104 by the mirror 106, and the external controllable mirror 130 is configured in an orientation to reflect the received light through the screens 118 and toward the light scattering surface 114. Accordingly, in the masking self-test state, and in absence of any masking of the smoke detector 100, the light from the LED 104 is reflected by the mirror 106 through the screens 118 and toward the external controllable mirror 130, then reflected by the external controllable mirror 130 through the screens 118 and toward the light scattering surface 114, then scattered by the light scattering surface 114 to be detectable by the photodetector 108.

Figure 15:
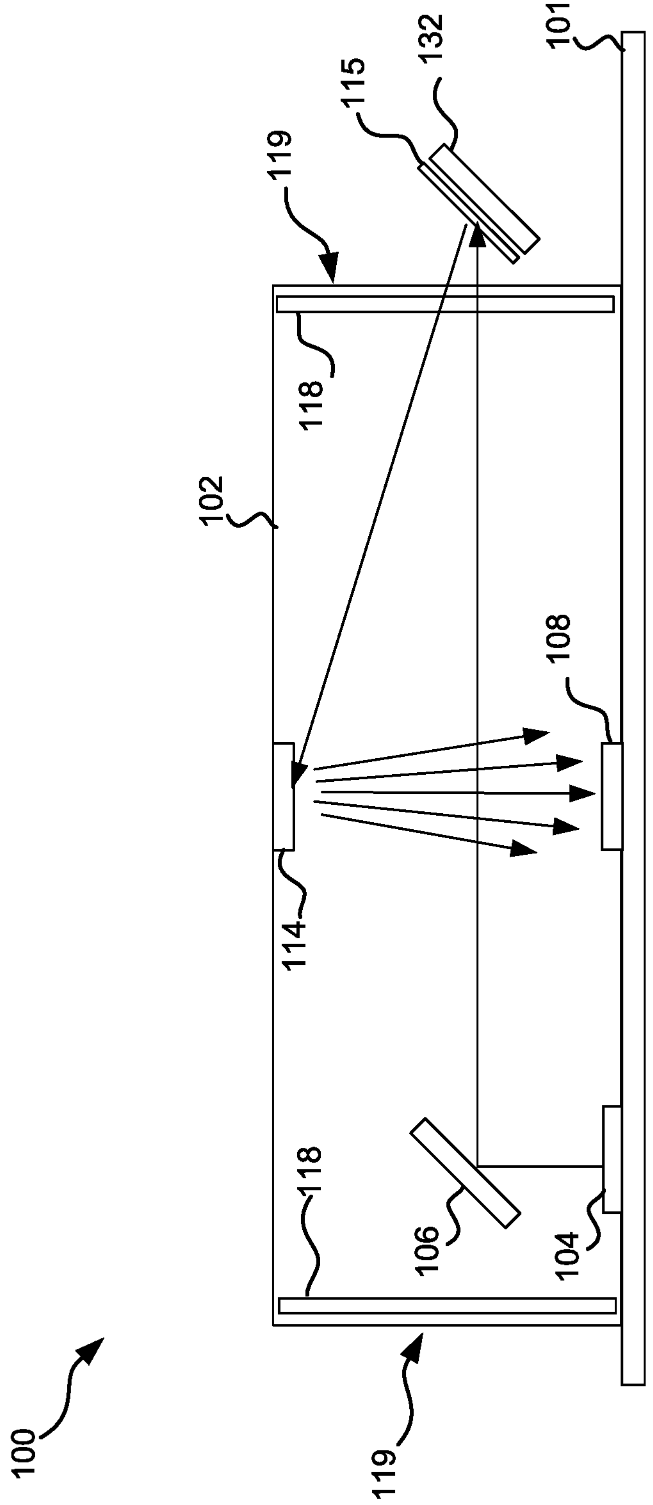
FIG. 15 is a side, cross-sectional view of an example smoke detector that includes self-test functionality for detecting a masking of the smoke detector, according to some aspects.

Referring to FIG. 15, in another non-limiting alternative or additional aspect, for example, an external self-test mirror 132 is fixedly configured external to the smoke chamber 102 and is covered by a shutter 115 that is controllable between a closed state (for normal operation of the smoke detector 100) and an open state (for self-testing the smoke detector 100). The external self-test mirror 132 is fixedly positioned in the path of the light reflected from the LED 104 by the mirror 106, and the external self-test mirror 132 is fixedly configured in an orientation to reflect any received light toward the light scattering surface 114 within the smoke chamber 102. When the shutter 115 is closed, no light reaches the external self-test mirror 132. However, when the shutter 115 is opened, and in absence of any masking of the smoke detector 100, the light from the LED 104 is reflected by the mirror 106 through the screens 118 toward the external self-test mirror 132, then reflected by the external self-test mirror 132 through the screens 118 toward the light scattering surface 114, then scattered by the light scattering surface 114 to be detectable by the photodetector 108.

In some non-limiting aspects, the smoke detector 100 may include masking self-test functionality (e.g., as described with reference to FIGS. 13-15), as well as other self-test functionality (e.g., as described with reference to FIGS. 1-12) for self-testing the LED 104 and the photodetector 108. In some cases, only one of the self-test functionalities may be enabled at a time, and the other one is disabled, so that the readings of the photodetector 108 may be associated with one type of self-test at a time, e.g., may be associated with either masking self-testing or associated with self-testing of the LED 104 and the photodetector 108.

For example, when self-testing the LED 104 and the photodetector 108 (e.g., as described with reference to FIGS. 1-12), the masking self-test functionality may be disabled so that any light received by the photodetector 108 is not re-directed from outside the smoke detector 100. The disabling may be performed, for example, by turning off the external LEDs 116, configuring the external controllable mirror 130 in the normal state, closing the shutter 115 that covers the external controllable mirror 130, etc.

Similarly, when performing the masking self-test, the self-testing of the LED 104 and the photodetector 108 may be disabled so that any light received by the photodetector 108 is re-directed only from outside the smoke detector 100. The disabling may be performed, for example, by turning off the LED 104, configuring the controllable mirror 112 in the normal state, closing the shutter 115 that covers the controllable mirror 112, closing the shutter 115 that covers the self-test mirror 120, configuring the mirror 106 in the normal state, etc.

In some further alternative or additional aspects, multiple external LEDs 116 may be focused and aligned to generate interference patterns that create scattering so that the scattered light is detectable by the photodetector 108. In some non-limiting aspects, depending on characteristics of the photodetector 108, different wavelengths of light may be selected for the external LEDs 116.

In some non-limiting example aspects, the controllable mirror 112 and/or the external controllable mirror 130 may be configured using technology similar to a flip-dot unit. Specifically, for example, a mirror may be configured on a disk that includes a magnet and is freely rotatable between two opposite poles of a U-shaped ferromagnetic core. The mirror is initially in the normal state when the coil is not magnetized. The core may then be magnetized, for example, by applying power to a relay coil that coils around a portion of the core. When the core is magnetized, the mirror flips. When power is removed from the relay coil and the core is demagnetized, the mirror flips back to the normal state.

The present self-testing aspects are not limited to the example smoke detector configurations in FIGS. 1-15, and may be applicable to other smoke detectors such as, but not limited to, smoke detectors that do not include the mirror 106.

Figure 16:
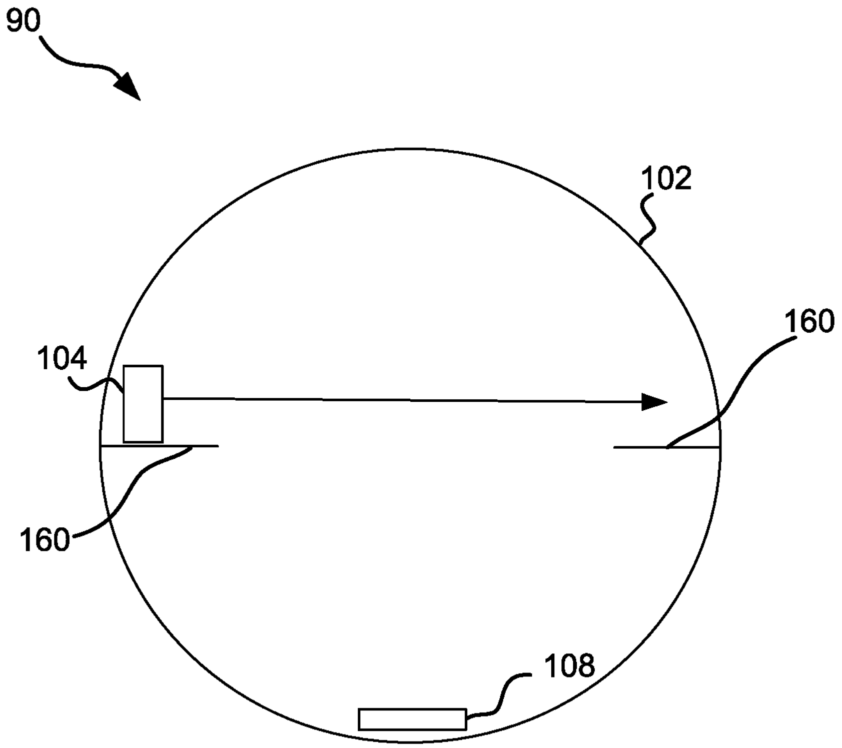
FIG. 16 is a top, cross-sectional view of an example smoke detector according to some aspects.

For example, referring to FIG. 16, in one non-limiting example aspect of a smoke detector 90, the LED 104 and the photodetector 108 are not surface-mounted to the PCB. Instead, the LED 104 and the photodetector 108 may be, for example, leaded components mounted at some offset above the PCB. The LED 104 is configured such that the light generated by the LED 104 passes substantially in parallel to the surface of the photodetector 108. The light path and one or more partitions 160 in the smoke chamber 102 are configured prevent the light from directly striking the photodetector 108. Accordingly, in absence of any smoke in the smoke chamber 102, the light generated by the LED 104 does not strike the photodetector 108 and is therefore not detectable by the photodetector 108.

Figure 17:
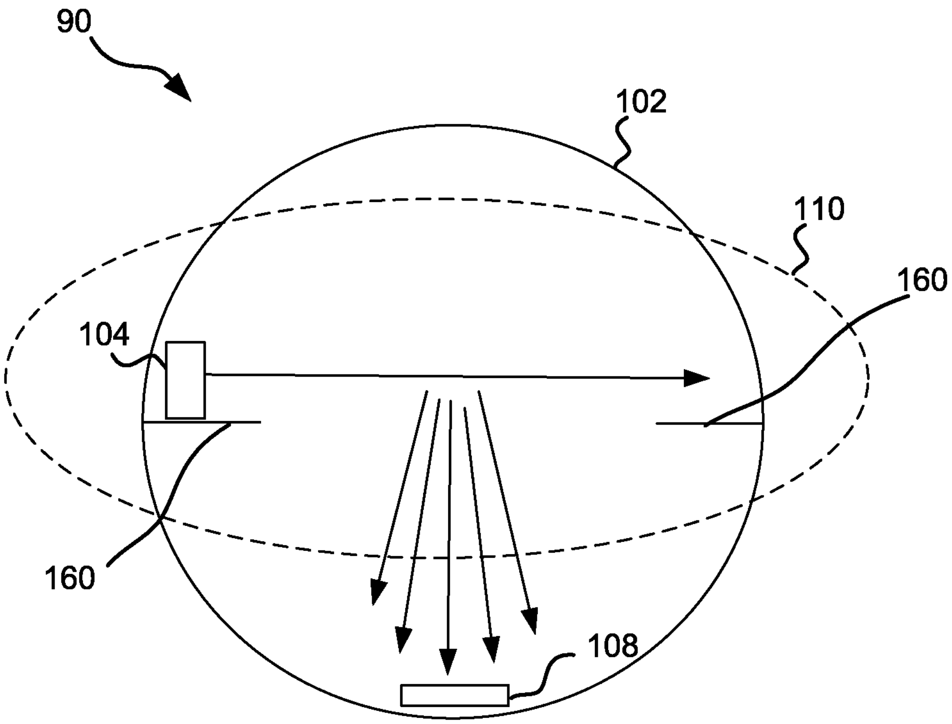
FIG. 17 is a top, cross-sectional view of the example smoke detector of FIG. 16 when smoke enters a smoke chamber of the smoke detector, according to some aspects.

Referring to FIG. 17, when smoke 110 enters the smoke chamber 102 of the smoke detector 90, the light generated by the LED 104 is scattered by smoke particles in the smoke 110, and at least a portion of the scattered light strikes the photodetector 108 and therefore may be detectable by the photodetector 108. A smoke alarm is triggered when there is sufficient scattered light striking the photodetector 108 and detected by the photodetector 108, which may happen when sufficient smoke enters the smoke chamber 102. This method of smoke detection is similar to the one described with reference to FIG. 2, with an alternative method for physical mounting of the components.

In some aspects, one or more self-testing components (e.g., the controllable mirror 112, the light scattering surface 114, the self-test mirror 120, the shutter 115, the one or more external LEDs 116, the external controllable mirror 130, the external self-test mirror 132, etc.) may be configured similar to the various aspects described above to implement self-test functionality for self-testing the LED 104 and/or the photodetector 108 (e.g., FIGS. 1-12), and/or to implement masking self-test functionality (e.g., FIGS. 13-15) in the smoker detector 90.

Figure 18:
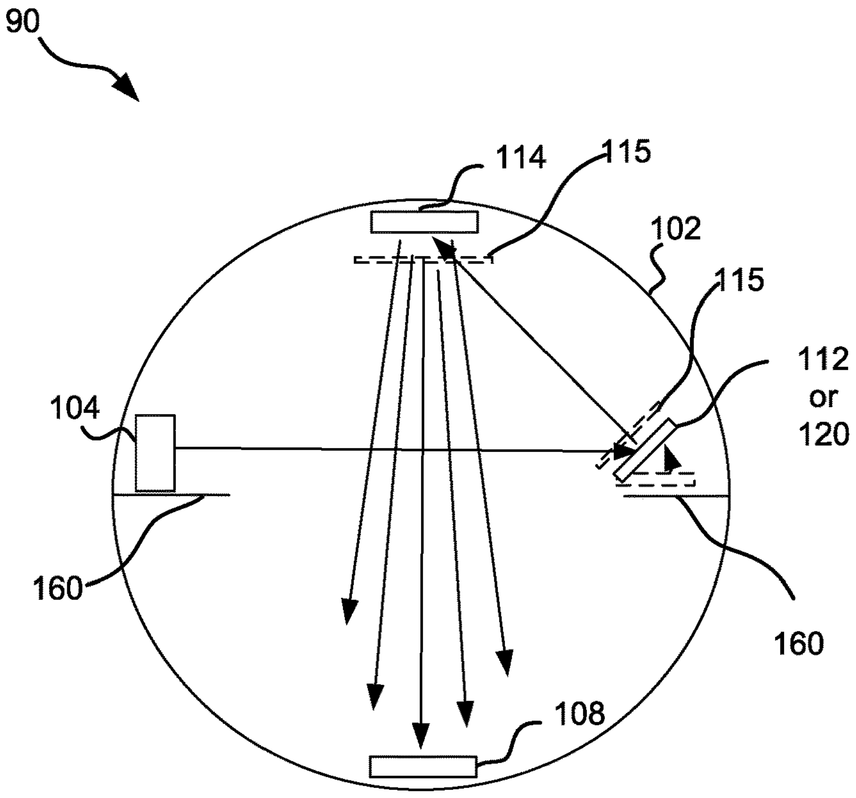
FIG. 18 is a top, cross-sectional view of an example smoke detector that includes self-test functionality for self-testing an LED and a photodetector of the smoke detector, according to some aspects.

For example, referring to FIG. 18, a controllable mirror 112 in the self-test state may be configured directly in the path of the light generated by the LED 104 to reflect the light from the LED 104 to a light scattering surface 114 facing the photodetector 108 so that the light is scattered toward the photodetector 108. Alternatively, instead of the controllable mirror 112, a self-test mirror 120 may be fixedly configured directly in the path of the light generated by the LED 104 and may be covered by a shutter 115. When the shutter 115 is open, the self-test mirror 120 reflects the light from the LED 104 to a light scattering surface 114 facing the photodetector 108 so that the light is scattered toward the photodetector 108. Alternatively, the shutter 115 may be configured to cover the light scattering surface 114.

Figure 19:
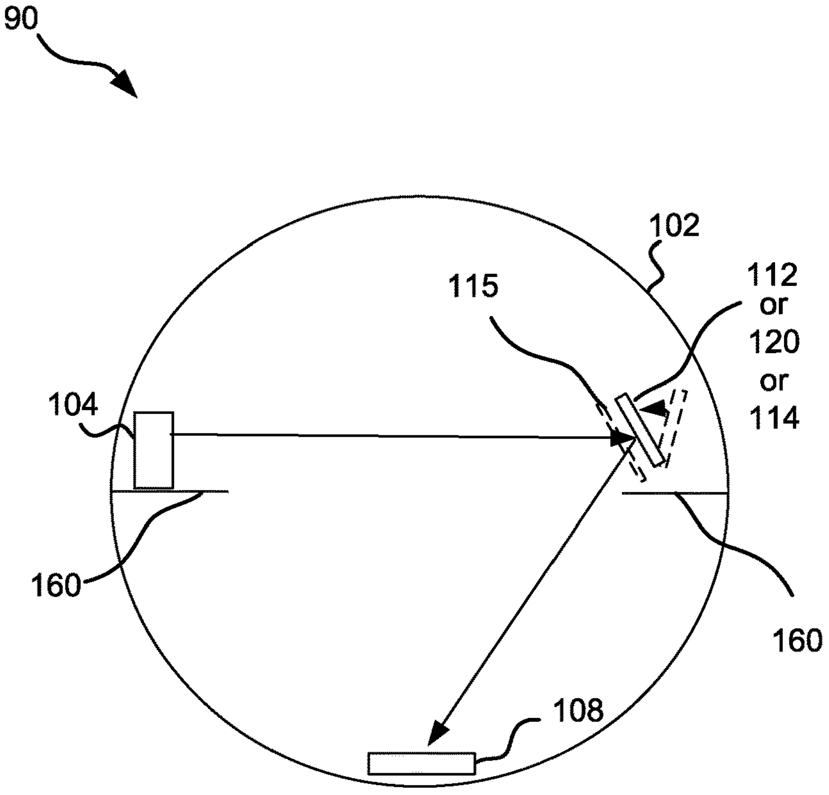
FIG. 19 is a top, cross-sectional view of an example smoke detector that includes self-test functionality for self-testing an LED and a photodetector of the smoke detector, according to some aspects.

Alternatively, for example, referring to FIG. 19, the controllable mirror 112 in the self-test state may be configured directly in the path of the light generated by the LED 104 to reflect the light toward the photodetector 108. Alternatively, instead of the controllable mirror 112, a self-test mirror 120 may be fixedly configured directly in the path of the light generated by the LED 104 and may be covered by a shutter 115. When the shutter 115 is open, the self-test mirror 120 reflects the light from the LED 104 directly toward the photodetector 108. Alternatively, instead of the controllable mirror 112 or the self-test mirror 120, a controllable light scattering surface 114 in the self-test state may be configured directly in the path of the light generated by the LED 104 to scatter the light from the LED 104 toward the photodetector 108. Alternatively, instead of the controllable light scattering surface 114, a fixed light scattering surface 114 may be fixedly configured directly in the path of the light generated by the LED 104 and may be covered by a shutter 115. When the shutter 115 is open, the light scattering surface 114 scatters the light from the LED 104 directly toward the photodetector 108.

Figure 20:
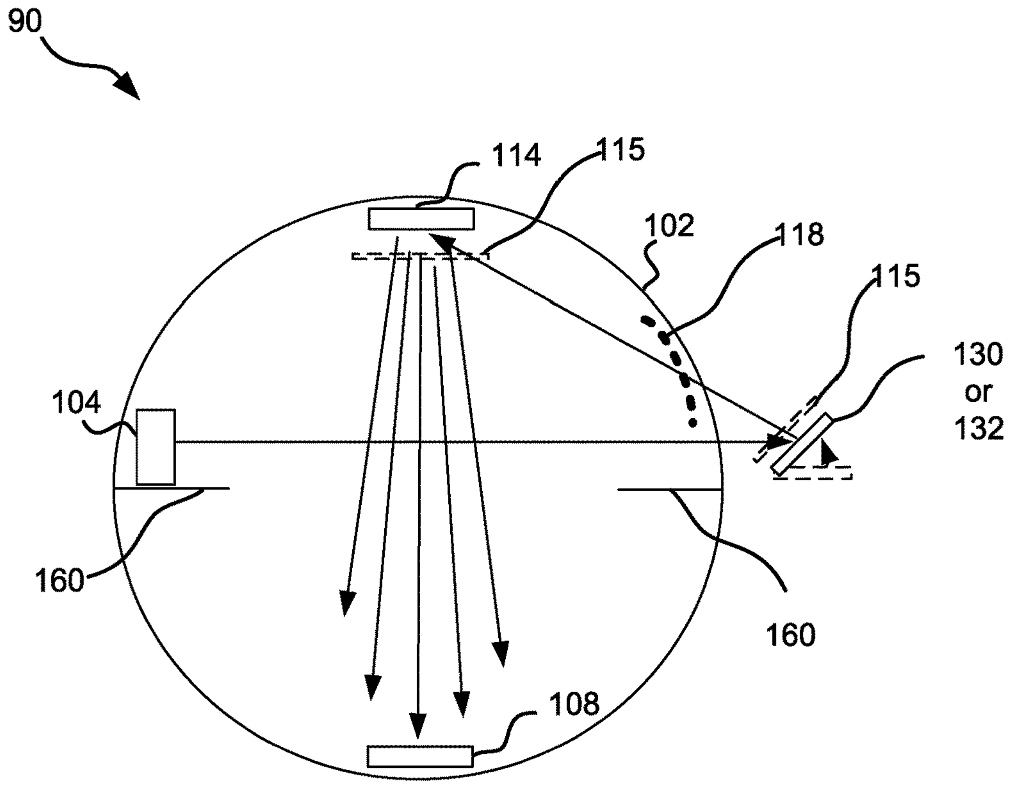
FIG. 20 is a top, cross-sectional view of an example smoke detector that includes self-test functionality for detecting a masking of the smoke detector, according to some aspects.

Some alternative or additional aspects may implement masking self-test functionality in the smoke detector 90. For example, referring to FIG. 20, an external controllable mirror 130 in the self-test state may be configured directly in the path of the light generated by the LED 104. In absence of any masking of the smoke detector 90, the external controllable mirror 130 reflects the light from the LED 104 through the screens 118 and toward the light scattering surface 114 facing the photodetector 108 so that the light is scattered toward the photodetector 108. Alternatively, instead of the external controllable mirror 130, an external self-test mirror 132 may be fixedly configured directly in the path of the light generated by the LED 104 and may be covered by a shutter 115. When the shutter 115 is open, and in absence of any masking of the smoke detector 90, the external self-test mirror 132 reflects the light from the LED 104 through the screens 118 and toward the light scattering surface 114 facing the photodetector 108 so that the light is scattered toward the photodetector 108.

Figure 21:
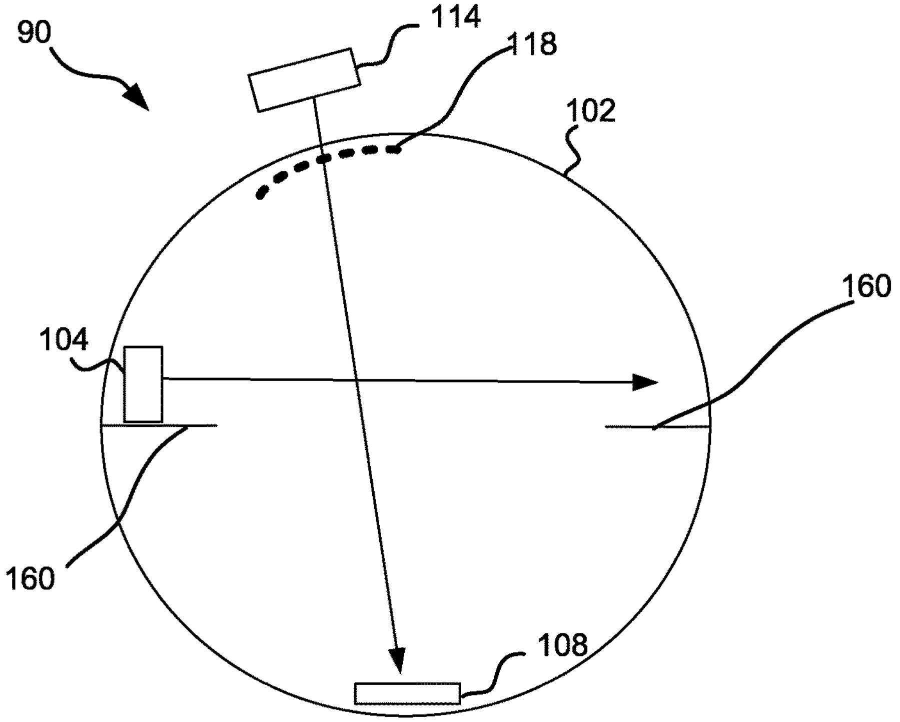
FIG. 21 is a top, cross-sectional view of an example smoke detector that includes self-test functionality for detecting a masking of the smoke detector, according to some aspects.

In some alternative aspects, for example, referring to FIG. 21, one or more external LEDs 116 may be configured to reflect light through the screens 118 and toward the photodetector 108. In absence of any masking of the smoke detector 90, the light passes through the screens 118 and strikes the photodetector 108.

Figure 22:
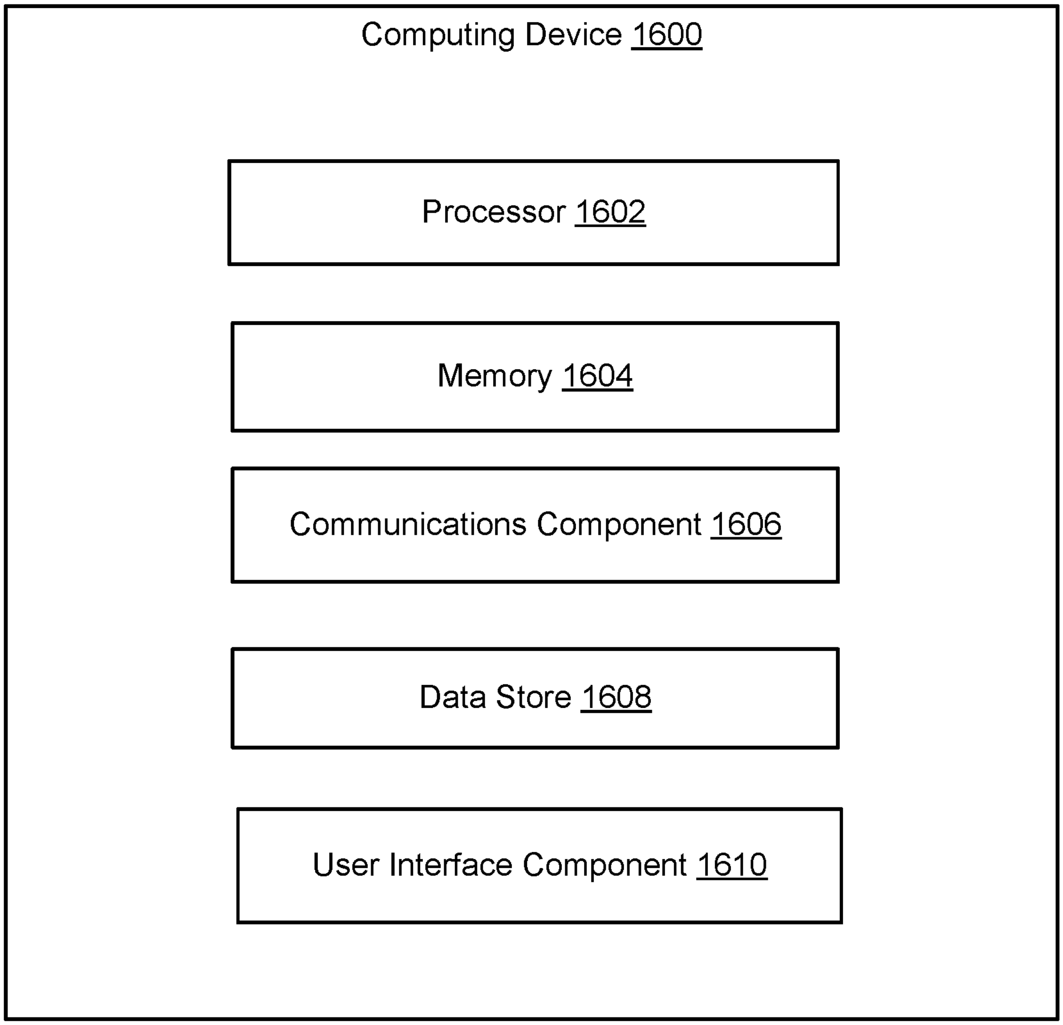
FIG. 22 is a block diagram of an example computing device which may implement all or a portion of the functionality of a smoke detector, according to some aspects.

FIG. 22 illustrates an example block diagram providing details of computing components in a computing device 1600 that may implement all or a portion of one or more components in a smoke detector (e.g., the smoke detector 100 or the smoke detector 90) or any other component described above. The computing device 1600 includes a processor 1602 which may be configured to execute or implement software, hardware, and/or firmware modules that perform any functionality described above with reference to one or more components in a smoke detector or any other component described above. For example, the processor 1602 may be configured to execute instructions to provide self-test functionality, as described herein with reference to various aspects.

The processor 1602 may be a micro-controller and/or may include a single or multiple set of processors or multi-core processors. Moreover, the processor 1602 may be implemented as an integrated processing system and/or a distributed processing system. The computing device 1600 may further include a memory 1604, such as for storing local versions of applications being executed by the processor 1602, related instructions, parameters, etc. The memory 1604 may include a type of memory usable by a computer, such as random access memory (RAM), read only memory (ROM), tapes, flash drives, magnetic discs, optical discs, volatile memory, non-volatile memory, and any combination thereof. Additionally, the processor 1602 and the memory 1604 may include and execute an operating system executing on the processor 1602, one or more applications, display drivers, etc., and/or other components of the computing device 1600.

Further, the computing device 1600 may include a communications component 1606 that provides for establishing and maintaining communications with one or more other devices, parties, entities, etc., utilizing hardware, software, and services. The communications component 1606 may carry communications between components on the computing device 1600, as well as between the computing device 1600 and external devices, such as devices located across a communications network and/or devices serially or locally connected to the computing device 1600. For example, the communications component 1606 may include one or more buses, and may further include transmit chain components and receive chain components associated with a wireless or wired transmitter and receiver, respectively, operable for interfacing with external devices.

Additionally, the computing device 1600 may include a data store 1608, which can be any suitable combination of hardware and/or software, that provides for mass storage of information, databases, and programs. For example, the data store 1608 may be or may include a data repository for applications and/or related parameters not currently being executed by the processor 1602. In addition, the data store 1608 may be a data repository for an operating system, application, display driver, etc., executing on the processor 1602, and/or one or more other components of the computing device 1600.

The computing device 1600 may also include a user interface component 1610 operable to receive inputs from a user of the computing device 1600 and further operable to generate outputs for presentation to the user (e.g., via a display interface to a display device). The user interface component 1610 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 1610 may include one or more output devices, including but not limited to a display interface, a speaker, a haptic feedback mechanism, a printer, any other mechanism capable of presenting an output to a user, or any combination thereof.

Figure 23:
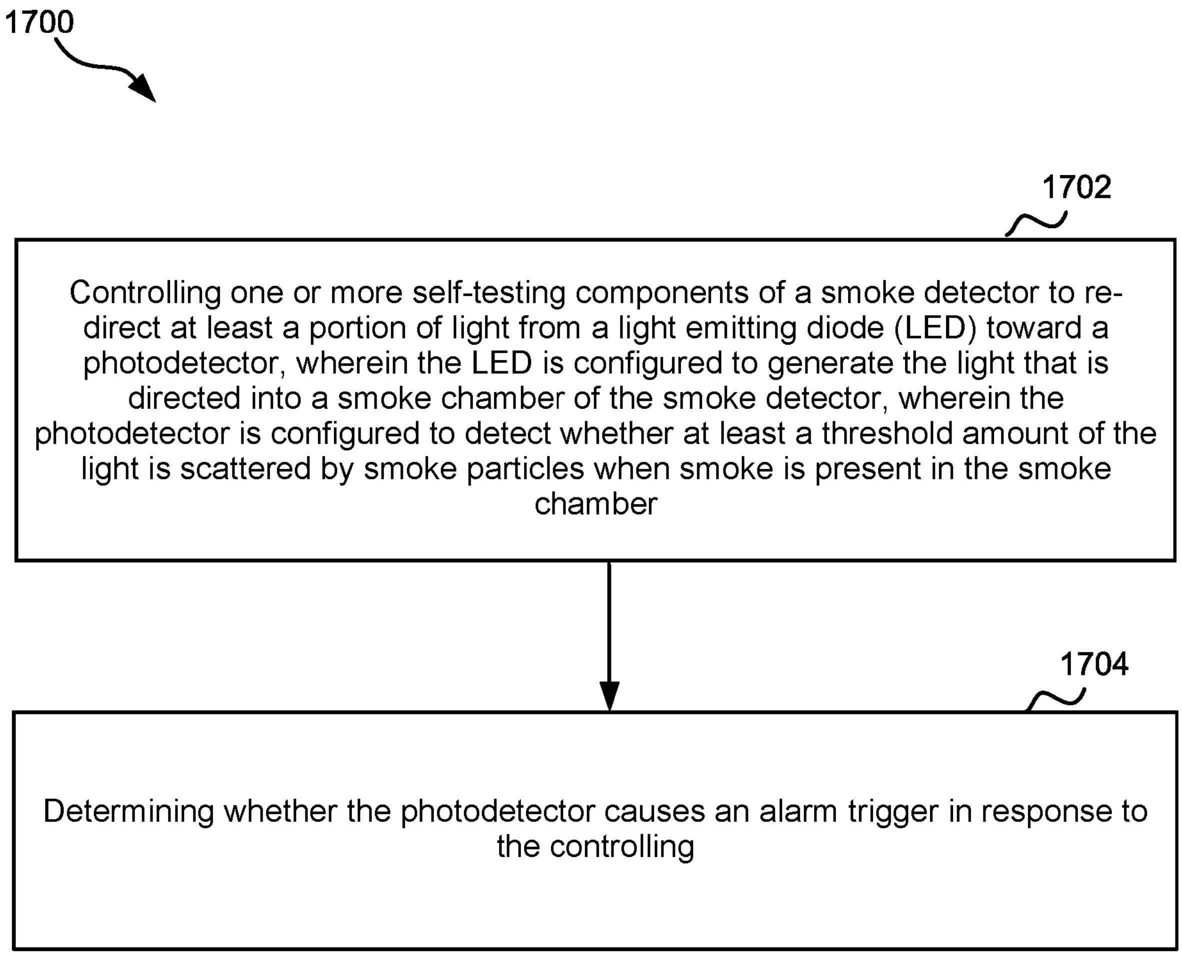
FIG. 23 is a flowchart of an example method of self-testing a smoke detector, according to some aspects.

FIG. 23 is a flowchart of a method 1700 of operation of the computing device 1600 that may implement all or a portion of one or more components in the smoke detector 100, the smoke detector 90, or any other component described above with reference to FIGS. 1-22. The method 1700 may be performed by one or more components of the computing device 1600 that may implement all or a portion of one or more components in the smoke detector 100, the smoke detector 90, or any other component described above with reference to FIGS. 1-22.

At 1702, the method 1700 includes controlling one or more self-testing components of a smoke detector to re-direct at least a portion of light from an LED toward a photodetector, wherein the LED is configured to generate the light that is directed into a smoke chamber of the smoke detector, wherein the photodetector is configured to detect whether at least a threshold amount of the light is scattered by smoke particles when smoke is present in the smoke chamber. For example, referring to FIG. 3, in one non-limiting aspect, the smoke detector 100 may configure the controllable mirror 112 in the self-test state, in which case the light from the LED 104 is reflected by the mirror 106 toward the controllable mirror 112, then reflected by the controllable mirror 112 toward the light scattering surface 114, then scattered by the light scattering surface 114 to be detectable by the photodetector 108.

At 1704, the method 1700 includes determining whether the photodetector causes an alarm trigger in response to the controlling. For example, the smoke detector 100 may determine whether the photodetector 108 triggers an alarm in response to configuring the controllable mirror 112 in the self-test state. The self-test of the smoke detector 100 has been successful if the photodetector 108 triggers an alarm in response to configuring the controllable mirror 112 in the self-test state.

In some optional aspects, controlling the one or more self-testing components at 1704 comprises at least one of: controlling a position or orientation of a controllable mirror to re-direct at least a portion of the light from the LED toward the photodetector or toward a light scattering surface configured to scatter the light toward the photodetector; or opening a shutter to allow at least a portion of the light from the LED to be re-directed by a mirror toward the photodetector or to be scattered by the light scattering surface toward the photodetector, as described herein with reference to various example aspects.

Some further example aspects are provided below.

1. A smoke detector, comprising:

a smoke chamber;

a light emitting diode (LED) configured to generate light that is directed into the smoke chamber;

a photodetector configured to detect whether at least a threshold amount of the light is scattered by smoke particles when smoke is present in the smoke chamber; and one or more self-testing components configured to re-direct at least a portion of the light from the LED toward the photodetector for self-testing the LED and the photodetector.

2. The smoke detector of clause 1, wherein the one or more self-testing components include:

a light scattering surface facing the photodetector;

a controllable mirror having a position or orientation that is controllable between a normal state and a self-test state;

wherein, in the normal state, the controllable mirror is configured to avoid reflecting the light toward the light scattering surface; and wherein, in the self-test state, the controllable mirror is positioned in a path of the light directed into the smoke chamber, and is configured in an orientation to reflect the light toward the light scattering surface to be scattered by the light scattering surface toward the photodetector.

3. The smoke detector of clause 1, wherein the one or more self-testing components include:

a light scattering surface facing the photodetector;

a self-test mirror positioned in a path of the light directed into the smoke chamber;

a shutter covering the self-test mirror and controllable between a closed state and an open state;

wherein, in the closed state, no light reaches the self-test mirror; and wherein, in the open state, the light directed into the smoke chamber is reflected by the self-test mirror toward the light scattering surface to be scattered by the light scattering surface toward the photodetector.

4. The smoke detector of clause 1, wherein the one or more self-testing components include:

a light scattering surface facing the photodetector;

a self-test mirror positioned in a path of the light directed into the smoke chamber, wherein the light directed into the smoke chamber is reflected by the self-test mirror toward the light scattering surface;

a shutter covering the light scattering surface and controllable between a closed state and an open state;

wherein, in the closed state, no light reaches the light scattering surface; and wherein, in the open state, the light directed into the smoke chamber is reflected by the self-test mirror toward the light scattering surface to be scattered by the light scattering surface toward the photodetector.

5. The smoke detector of clause 1, wherein the one or more self-testing components include:

a light scattering surface facing the photodetector;

a surface-mount controllable mirror having a position or orientation that is controllable between a normal state and a self-test state;

a self-test mirror positioned in a path of the light directed into the smoke chamber, wherein the light directed into the smoke chamber is reflected by the self-test mirror toward the surface-mount controllable mirror;

wherein, in the normal state, the surface-mount controllable mirror is configured to avoid reflecting the light toward the light scattering surface; and wherein, in the self-test state, the surface-mount controllable mirror is configured in an orientation to reflect the light toward the light scattering surface to be scattered by the light scattering surface toward the photodetector.

6. The smoke detector of clause 1, wherein the one or more self-testing components include:

a light scattering surface facing the photodetector;

a surface-mount mirror;

a self-test mirror positioned in a path of the light directed into the smoke chamber, wherein the light directed into the smoke chamber is reflected by the self-test mirror toward the surface-mount mirror;

a shutter covering the self-test mirror and controllable between a closed state and an open state;

wherein, in the closed state, no light reaches the self-test mirror; and wherein, in the open state, the light directed into the smoke chamber is reflected by the self-test mirror toward the surface-mount mirror and then by the surface-mount mirror toward the light scattering surface to be scattered by the light scattering surface toward the photodetector.

7. The smoke detector of clause 1, wherein the one or more self-testing components include:

a light scattering surface facing the photodetector;

a surface-mount mirror;

a self-test mirror positioned in a path of the light directed into the smoke chamber, wherein the light directed into the smoke chamber is reflected by the self-test mirror toward the surface-mount mirror;

a shutter covering the surface-mount mirror and controllable between a closed state and an open state;

wherein, in the closed state, no light reaches the surface-mount mirror; and wherein, in the open state, the light directed into the smoke chamber is reflected by the self-test mirror toward the surface-mount mirror and then by the surface-mount mirror toward the light scattering surface to be scattered by the light scattering surface toward the photodetector.

8. The smoke detector of clause 1, wherein the one or more self-testing components include:

a light scattering surface facing the photodetector;

a surface-mount mirror;

a self-test mirror positioned in a path of the light directed into the smoke chamber, wherein the light directed into the smoke chamber is reflected by the self-test mirror toward the surface-mount mirror;

a shutter covering the light scattering surface and controllable between a closed state and an open state;

wherein, in the closed state, no light reaches the light scattering surface; and wherein, in the open state, the light directed into the smoke chamber is reflected by the self-test mirror toward the surface-mount mirror and then by the surface-mount mirror toward the light scattering surface to be scattered by the light scattering surface toward the photodetector.

9. The smoke detector of clause 1, wherein the one or more self-testing components include:

a controllable mirror having a position or orientation that is controllable between a normal state and a self-test state;

wherein, in the normal state, the controllable mirror is configured to avoid reflecting the light toward the photodetector; and wherein, in the self-test state, the controllable mirror is positioned in a path of the light directed into the smoke chamber, and is configured in an orientation to reflect the light toward the photodetector.

10. The smoke detector of clause 1, wherein the one or more self-testing components include:

a controllable light scattering surface having a position or orientation that is controllable between a normal state and a self-test state;

wherein, in the normal state, the controllable light scattering surface is configured to avoid scattering the light toward the photodetector; and wherein, in the self-test state, the controllable light scattering surface is positioned in a path of the light directed into the smoke chamber, and is configured in an orientation to scatter the light toward the photodetector.

11. The smoke detector of clause 1, wherein the one or more self-testing components include:

a self-test mirror positioned in a path of the light directed into the smoke chamber;

a shutter covering the self-test mirror and controllable between a closed state and an open state;

wherein, in the closed state, no light reaches the self-test mirror; and wherein, in the open state, the light directed into the smoke chamber is reflected by the self-test mirror toward the photodetector.

12. The smoke detector of clause 1, wherein the one or more self-testing components include:

a light scattering surface positioned in a path of the light directed into the smoke chamber;

a shutter covering the light scattering surface and controllable between a closed state and an open state;

wherein, in the closed state, no light reaches the light scattering surface; and wherein, in the open state, the light directed into the smoke chamber is scattered by the light scattering surface toward the photodetector.

13. The smoke detector of clause 1, wherein the one or more self-testing components comprise a controllable mirror positioned in a path of the light generated by the LED and having an orientation that is controllable between a normal state and a self-test state;

wherein, in the normal state, the controllable mirror reflects the light from the LED into the smoke chamber such that the light avoids the photodetector; and wherein, in the self-test state, the controllable mirror is configured to reflect the light toward the photodetector.

14. The smoke detector of clause 1, wherein the one or more self-testing components comprise a controllable light scattering surface positioned in a path of the light generated by the LED and having an orientation that is controllable between a normal state and a self-test state;

wherein, in the normal state, the controllable light scattering surface is configured to avoid scattering the light from the LED toward the photodetector; and wherein, in the self-test state, the controllable light scattering surface is configured to scatter the light toward the photodetector.

15. The smoke detector of clause 1, further comprising:

a light scattering surface facing the photodetector;

one or more screens covering one or more smoke inlets of the smoke chamber;

one or more external LEDs configured external to the smoke chamber and configured to emit external light into the one or more screens and toward the light scattering surface; and wherein, in absence of a masking of the smoke detector, at least a portion of the external light from the one or more external LEDs passes through the one or more screens and strikes the light scattering surface to be scattered toward the photodetector.

16. The smoke detector of clause 1, further comprising:

a light scattering surface facing the photodetector;

one or more screens covering one or more smoke inlets of the smoke chamber;

an external controllable mirror configured external to the smoke chamber and having a position or orientation that is controllable between a normal state and a self-test state;

wherein, in the normal state, the external controllable mirror is configured to avoid reflecting the light through the one or more screens and toward the light scattering surface; and wherein, in the self-test state, the external controllable mirror is positioned in a path of the light directed into the smoke chamber;

wherein, in the self-test state, and in absence of a masking of the smoke detector, the external controllable mirror is configured in an orientation to reflect the light through the one or more screens and toward the light scattering surface to be scattered by the light scattering surface toward the photodetector.

17. The smoke detector of clause 1, further comprising:

a light scattering surface facing the photodetector;

one or more screens covering one or more smoke inlets of the smoke chamber;

an external self-test mirror configured external to the smoke chamber and positioned in a path of the light directed into the smoke chamber;

a shutter covering the external self-test mirror and controllable between a closed state and an open state;

wherein, in the closed state, no light reaches the external self-test mirror; and wherein, in the open state, and in absence of a masking of the smoke detector, the light directed into the smoke chamber passes through the one or more screens and is reflected by the external self-test mirror back through the one or more screens and toward the light scattering surface to be scattered by the light scattering surface toward the photodetector.

18. A smoke detector, comprising:

a smoke chamber;

a photodetector configured to detect at least a portion of scattered light when scattered by smoke particles when smoke is present in the smoke chamber; and one or more masking self-test components configured external to the smoke chamber and configured to direct light from outside the smoke chamber into the smoke chamber and toward the photodetector for determining whether the smoke detector has been masked.

19. The smoke detector of clause 18, further comprising:

a light scattering surface facing the photodetector;

one or more screens covering one or more smoke inlets of the smoke chamber;

wherein the one or more masking self-test components comprise one or more external light emitting diodes (LEDs) configured external to the smoke chamber and configured to emit external light into the one or more screens and toward the light scattering surface; and wherein, in absence of a masking of the smoke detector, at least a portion of the external light from the one or more external LEDs passes through the one or more screens and strikes the light scattering surface to be scattered toward the photodetector.

20. The smoke detector of clause 18, further comprising:

a light emitting diode (LED) configured to generate light that is directed into the smoke chamber;

a light scattering surface facing the photodetector;

one or more screens covering one or more smoke inlets of the smoke chamber;

wherein the one or more masking self-test components comprise an external controllable mirror configured external to the smoke chamber and having a position or orientation that is controllable between a normal state and a self-test state;

wherein, in the normal state, the external controllable mirror is configured to avoid reflecting the light through the one or more screens and toward the light scattering surface; and wherein, in the self-test state, the external controllable mirror is positioned in a path of the light directed into the smoke chamber;

wherein, in the self-test state, and in absence of a masking of the smoke detector, the external controllable mirror is configured in an orientation to reflect the light through the one or more screens and toward the light scattering surface to be scattered by the light scattering surface toward the photodetector.

21. The smoke detector of clause 18, further comprising:

a light emitting diode (LED) configured to generate light that is directed into the smoke chamber;

a light scattering surface facing the photodetector;

one or more screens covering one or more smoke inlets of the smoke chamber;

wherein the one or more masking self-test components comprise:

an external self-test mirror configured external to the smoke chamber and positioned in a path of the light directed into the smoke chamber; and a shutter covering the external self-test mirror and controllable between a closed state and an open state;

wherein, in the closed state, no light reaches the external self-test mirror; and wherein, in the open state, and in absence of a masking of the smoke detector, the light directed into the smoke chamber passes through the one or more screens and is reflected by the external self-test mirror back through the one or more screens and toward the light scattering surface to be scattered by the light scattering surface toward the photodetector.

22. A method, comprising:

controlling one or more self-testing components of a smoke detector to re-direct at least a portion of light from a light emitting diode (LED) toward a photodetector, wherein the LED is configured to generate the light that is directed into a smoke chamber of the smoke detector, wherein the photodetector is configured to detect whether at least a threshold amount of the light is scattered by smoke particles when smoke is present in the smoke chamber; and determining whether the photodetector causes an alarm trigger in response to the controlling.

23. The method of clause 22, wherein controlling the one or more self-testing components comprises at least one of:

controlling a position or orientation of a controllable mirror to re-direct at least a portion of the light from the LED toward the photodetector or toward a light scattering surface configured to scatter the light toward the photodetector; or opening a shutter to allow at least a portion of the light from the LED to be re-directed by a mirror toward the photodetector or to be scattered by the light scattering surface toward the photodetector.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A smoke detector, comprising:

a smoke chamber;

a light emitting diode (LED) configured to generate light that is directed into the smoke chamber;

a photodetector configured to detect whether at least a threshold amount of the light is scattered by smoke particles when smoke is present in the smoke chamber;

one or more self-testing components comprising a first mirror and a light scattering surface that faces the photodetector;

wherein the one or more self-testing components are configurable between a normal state and a self-test state;

wherein, in the normal state, the first mirror is configured to avoid reflecting the light toward the light scattering surface; and wherein, in the self-test state, the first mirror is positioned in a path of the light directed into the smoke chamber and is configured to reflect the light toward the light scattering surface to be scattered by the light scattering surface toward the photodetector for self-testing the LED and the photodetector.

2. The smoke detector of claim 1, wherein the first mirror has a position or orientation that is controllable between the normal state and the self-test state;

wherein, in the normal state, the first mirror is configured to avoid reflecting the light toward the light scattering surface; and wherein, in the self-test state, the first mirror is positioned in the path of the light directed into the smoke chamber, and is configured in an orientation to reflect the light toward the light scattering surface to be scattered by the light scattering surface toward the photodetector.

3. The smoke detector of claim 1, wherein the one or more self-testing components further include a shutter covering the first mirror and controllable between a closed state and an open state;

wherein, in the closed state, no light reaches the first mirror; and wherein, in the open state, the light directed into the smoke chamber is reflected by the first mirror toward the light scattering surface to be scattered by the light scattering surface toward the photodetector.

4. The smoke detector of claim 1, wherein the one or more self-testing components further include a shutter covering the light scattering surface and controllable between a closed state and an open state;

wherein, in the closed state, no light reaches the light scattering surface; and wherein, in the open state, the light directed into the smoke chamber is reflected by the first mirror toward the light scattering surface to be scattered by the light scattering surface toward the photodetector.

5. The smoke detector of claim 1, wherein the one or more self-testing components further include a surface-mount second mirror having a position or orientation that is controllable between the normal state and the self-test state;

wherein the light directed into the smoke chamber is reflected by the first mirror toward the surface-mount second mirror;

wherein, in the normal state, the surface-mount second mirror is configured to avoid reflecting the light toward the light scattering surface; and wherein, in the self-test state, the surface-mount second mirror is configured in an orientation to reflect the light toward the light scattering surface to be scattered by the light scattering surface toward the photodetector.

6. The smoke detector of claim 1, wherein the one or more self-testing components further include:

a surface-mount second mirror; and a shutter covering the first mirror and controllable between a closed state and an open state;

wherein, in the closed state, no light reaches the first mirror; and wherein, in the open state, the light directed into the smoke chamber is reflected by the first mirror toward the surface-mount second mirror and then by the surface-mount second mirror toward the light scattering surface to be scattered by the light scattering surface toward the photodetector.

7. The smoke detector of claim 1, wherein the one or more self-testing components further include:

a surface-mount second mirror; and a shutter covering the surface-mount second mirror and controllable between a closed state and an open state;

wherein, in the closed state, no light reaches the surface-mount second mirror; and wherein, in the open state, the light directed into the smoke chamber is reflected by the first mirror toward the surface-mount second mirror and then by the surface-mount second mirror toward the light scattering surface to be scattered by the light scattering surface toward the photodetector.

8. The smoke detector of claim 1, wherein the one or more self-testing components further include:

a surface-mount second mirror; and a shutter covering the light scattering surface and controllable between a closed state and an open state;

wherein, in the closed state, no light reaches the light scattering surface; and wherein, in the open state, the light directed into the smoke chamber is reflected by the first mirror toward the surface-mount second mirror and then by the surface-mount second mirror toward the light scattering surface to be scattered by the light scattering surface toward the photodetector.

9. The smoke detector of claim 1, further comprising:

one or more screens covering one or more smoke inlets of the smoke chamber;

one or more external LEDs configured external to the smoke chamber and configured to emit external light into the one or more screens and toward the light scattering surface; and wherein, in absence of a masking of the smoke detector, at least a portion of the external light from the one or more external LEDs passes through the one or more screens and strikes the light scattering surface to be scattered toward the photodetector.

10. The smoke detector of claim 1, further comprising:

one or more screens covering one or more smoke inlets of the smoke chamber;

an external second mirror configured external to the smoke chamber and having a position or orientation that is controllable between a first state and a second state;

wherein, in the first state, the external second mirror is configured to avoid reflecting the light through the one or more screens and toward the light scattering surface;

wherein, in the second state, the external second mirror is positioned in the path of the light directed into the smoke chamber; and wherein, in the second state, and in absence of a masking of the smoke detector, the external second mirror is configured in an orientation to reflect the light through the one or more screens and toward the light scattering surface to be scattered by the light scattering surface toward the photodetector.

11. The smoke detector of claim 1, further comprising:

one or more screens covering one or more smoke inlets of the smoke chamber;

an external second mirror configured external to the smoke chamber and positioned in the path of the light directed into the smoke chamber;

a shutter covering the external second mirror and controllable between a closed state and an open state;

wherein, in the closed state, no light reaches the external second mirror; and wherein, in the open state, and in absence of a masking of the smoke detector, the light directed into the smoke chamber passes through the one or more screens and is reflected by the external second mirror back through the one or more screens and toward the light scattering surface to be scattered by the light scattering surface toward the photodetector.

12. A smoke detector, comprising:

a smoke chamber;

a photodetector configured within the smoke chamber and configured to detect at least a portion of scattered light scattered by smoke particles when smoke is present in the smoke chamber;

one or more masking self-test components configured external to the smoke chamber;

wherein in absence of a masking of the smoke detector, the one or more masking self-test components are configured to direct light from outside the smoke chamber into the smoke chamber and toward the photodetector that is configured within the smoke chamber; and wherein the light directed by the one or more masking self-test components external to the smoke chamber and received by the photodetector within the smoke chamber is measurable for determining whether the smoke detector has been masked.

13. The smoke detector of claim 12, further comprising:

a light scattering surface facing the photodetector;

one or more screens covering one or more smoke inlets of the smoke chamber;

wherein the one or more masking self-test components comprise one or more external light emitting diodes (LEDs) configured external to the smoke chamber and configured to emit external light into the one or more screens and toward the light scattering surface; and wherein, in absence of the masking of the smoke detector, at least a portion of the external light from the one or more external LEDs passes through the one or more screens and strikes the light scattering surface to be scattered toward the photodetector.

14. The smoke detector of claim 12, further comprising:

a light emitting diode (LED) configured to generate light that is directed into the smoke chamber;

a light scattering surface facing the photodetector;

one or more screens covering one or more smoke inlets of the smoke chamber;

wherein the one or more masking self-test components comprise an external controllable mirror configured external to the smoke chamber and having a position or orientation that is controllable between a normal state and a self-test state;

wherein, in the normal state, the external controllable mirror is configured to avoid reflecting the light through the one or more screens and toward the light scattering surface; and wherein, in the self-test state, the external controllable mirror is positioned in a path of the light directed into the smoke chamber;

wherein, in the self-test state, and in absence of the masking of the smoke detector, the external controllable mirror is configured in an orientation to reflect the light through the one or more screens and toward the light scattering surface to be scattered by the light scattering surface toward the photodetector.

15. The smoke detector of claim 12, further comprising:

a light emitting diode (LED) configured to generate light that is directed into the smoke chamber;

a light scattering surface facing the photodetector;

one or more screens covering one or more smoke inlets of the smoke chamber;

wherein the one or more masking self-test components comprise:

an external self-test mirror configured external to the smoke chamber and positioned in a path of the light directed into the smoke chamber; and a shutter covering the external self-test mirror and controllable between a closed state and an open state;

wherein, in the closed state, no light reaches the external self-test mirror; and wherein, in the open state, and in absence of the masking of the smoke detector, the light directed into the smoke chamber passes through the one or more screens and is reflected by the external self-test mirror back through the one or more screens and toward the light scattering surface to be scattered by the light scattering surface toward the photodetector.

16. A method, comprising:

controlling one or more self-testing components of a smoke detector to re-direct at least a portion of light from a light emitting diode (LED) toward a photodetector, wherein the LED is configured to generate the light that is directed into a smoke chamber of the smoke detector, wherein the photodetector is configured to detect whether at least a threshold amount of the light is scattered by smoke particles when smoke is present in the smoke chamber, wherein the one or more self-testing components comprise a first mirror and a light scattering surface that faces the photodetector, wherein the one or more self-testing components are configurable between a normal state and a self-test state, wherein, in the normal state, the first mirror is configured to avoid reflecting the light toward the light scattering surface, wherein, in the self-test state, the first mirror is positioned in a path of the light directed into the smoke chamber and is configured to reflect the light toward the light scattering surface to be scattered by the light scattering surface toward the photodetector for self-testing the LED and the photodetector; and determining whether the photodetector causes an alarm trigger in response to the controlling.

17. The method of claim 16, wherein controlling the one or more self-testing components comprises at least one of:

controlling a position or orientation of the first mirror to re-direct at least a portion of the light from the LED toward the light scattering surface configured to scatter the light toward the photodetector; or opening a shutter to allow at least a portion of the light from the LED to be re-directed by the first mirror toward the photodetector or to be scattered by the light scattering surface toward the photodetector.

18. A smoke detector, comprising:

a smoke chamber;

a light emitting diode (LED) configured to generate light;

a photodetector configured to detect whether at least a threshold amount of the light generated by the LED is scattered by smoke particles when smoke is present in the smoke chamber;

a light reflecting or scattering surface configured in a path of the light generated by the LED;

a shutter covering the light reflecting or scattering surface and controllable between a closed state and an open state;

wherein, in the closed state, the light avoids reaching the light reflecting or scattering surface; and wherein, in the open state, the light reaches the light reflecting or scattering surface and is reflected or scattered by the light reflecting or scattering surface toward the photodetector for self-testing the LED and the photodetector.

* * * * *